US009748582B2

(12) United States Patent
Bhardwaj

(10) Patent No.: US 9,748,582 B2
(45) Date of Patent: Aug. 29, 2017

(54) FORMING AN INTERCONNECTION FOR SOLID-STATE BATTERIES

(71) Applicant: X Development LLC, Mountain View, CA (US)

(72) Inventor: Ramesh C. Bhardwaj, Fremont, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 393 days.

(21) Appl. No.: 14/230,796

(22) Filed: Mar. 31, 2014

(65) Prior Publication Data

US 2015/0280201 A1    Oct. 1, 2015

(51) Int. Cl.
*H01M 6/46*  (2006.01)
*H01M 2/20*  (2006.01)
(Continued)

(52) U.S. Cl.
CPC ............ *H01M 6/46* (2013.01); *H01M 2/204* (2013.01); *H01M 6/40* (2013.01);
(Continued)

(58) Field of Classification Search
None
See application file for complete search history.

(56) References Cited

U.S. PATENT DOCUMENTS 4,648,093 A * 3/1987 Sasnett .............. H01S 3/09705
                                                 372/38.07
7,479,349 B2   1/2009 O'Phelan et al.
(Continued)

FOREIGN PATENT DOCUMENTS

EP    2426753 A1   3/2012
JP    5182977 B1   4/2013
(Continued)

OTHER PUBLICATIONS

International Search Report and Written Opinion for Patent Application No. PCT/US2015/020175 mailed on May 28, 2015, 10 pages.
(Continued)

*Primary Examiner* — Scott J Chmielecki
(74) *Attorney, Agent, or Firm* — McDonnell Boehnen Hulbert & Berghoff LLP

(57) ABSTRACT

Disclosed are batteries and methods of manufacturing batteries with improved energy densities. In some embodiments, a first cathode current collector and a first anode current collector are provided on a first side of a substrate. A second cathode current collector and a second anode current collector are provided on a second side of the substrate. A laser is used to form: a first channel through the substrate between the first cathode current collector and the second cathode current collector, and a second channel through the substrate between the first anode current collector and the second anode current collector. A cathode interconnection is formed, via the first channel, between the first cathode current collector and the second cathode current collector. An anode interconnection is formed, via the second channel, between the first anode current collector and the second anode current collector.

20 Claims, 19 Drawing Sheets

(51) Int. Cl.
  *H01M 10/04* (2006.01)
  *H01M 10/0585* (2010.01)
  *H01M 6/40* (2006.01)
  *H01M 10/0562* (2010.01)
(52) U.S. Cl.
  CPC ... *H01M 10/0436* (2013.01); *H01M 10/0585* (2013.01); *H01M 10/0562* (2013.01); *Y10T 29/49108* (2015.01)

(56) References Cited

U.S. PATENT DOCUMENTS

| | | | |
|---|---|---|---|
| 8,304,115 | B1 | 11/2012 | Petkov et al. |
| 8,586,238 | B2 | 11/2013 | Chiang et al. |
| 2004/0064937 | A1 | 4/2004 | Krasnov et al. |
| 2006/0286448 | A1 | 12/2006 | Snyder et al. |
| 2007/0218310 | A1 | 9/2007 | Schuisky |
| 2008/0131356 | A1 | 6/2008 | Kumar |
| 2008/0263855 | A1 | 10/2008 | Li et al. |
| 2009/0136839 | A1 | 5/2009 | Kraznov et al. |
| 2009/0181303 | A1 | 7/2009 | Neudecker et al. |
| 2010/0227214 | A1 | 9/2010 | Krasnov et al. |
| 2010/0242265 | A1 | 9/2010 | Wadley et al. |
| 2011/0031865 | A1 | 2/2011 | Hussell et al. |
| 2011/0165466 | A1 | 7/2011 | Zhamu et al. |
| 2011/0244365 | A1 | 10/2011 | Ryu et al. |
| 2011/0281167 | A1 | 11/2011 | Sabi et al. |
| 2011/0310530 | A1 | 12/2011 | Laor |
| 2013/0164607 | A1* | 6/2013 | Shih .................. H01M 10/0436 429/179 |
| 2013/0189592 | A1 | 7/2013 | Roumi et al. |
| 2013/0220546 | A1 | 8/2013 | Kim et al. |
| 2013/0295471 | A1 | 11/2013 | Visco et al. |
| 2014/0087227 | A1* | 3/2014 | Shih .................. H01M 2/0277 429/99 |
| 2014/0227609 | A1* | 8/2014 | Frey ................... H01M 10/052 429/322 |
| 2014/0263215 | A1* | 9/2014 | Mosavi ............... B23K 26/386 219/121.71 |
| 2014/0318832 | A1* | 10/2014 | Huang ................ H05K 3/4691 174/254 |
| 2015/0004470 | A1* | 1/2015 | Bhardwaj ......... H01M 10/0562 429/152 |
| 2015/0155564 | A1* | 6/2015 | Chami ................... H01M 2/26 429/149 |

FOREIGN PATENT DOCUMENTS

| | | |
|---|---|---|
| JP | 2013062242 A | 4/2013 |
| KR | 10-0387121 B1 | 6/2003 |
| KR | 10-0412076 B1 | 12/2003 |
| WO | WO2012164642 A1 | 12/2012 |
| WO | WO2013044114 A1 | 3/2013 |
| WO | WO2013125021 A1 | 8/2013 |

OTHER PUBLICATIONS

Cmmunication and Supplementary European Search Report completed on Oct. 26, 2016, issued in connection with Patent Application No. EP 14818676.0, filed on Jun. 26, 2014, 8 pages.
International Searching Authority, International Search Report and Written Opinion for PCT/US2014/044316 mailed Oct. 15, 2014, 11 pages.
Graves, Christopher Ronald, "Recycling C02 into Sustainable Hydrocarbon Fuels: Electrolysis of C02 and H20"; submitted in partial fulfillment of the requirements for the degree of Doctor of Philosophy in the Graduate School of Art and Sciences; Columbia University, 2010.

* cited by examiner

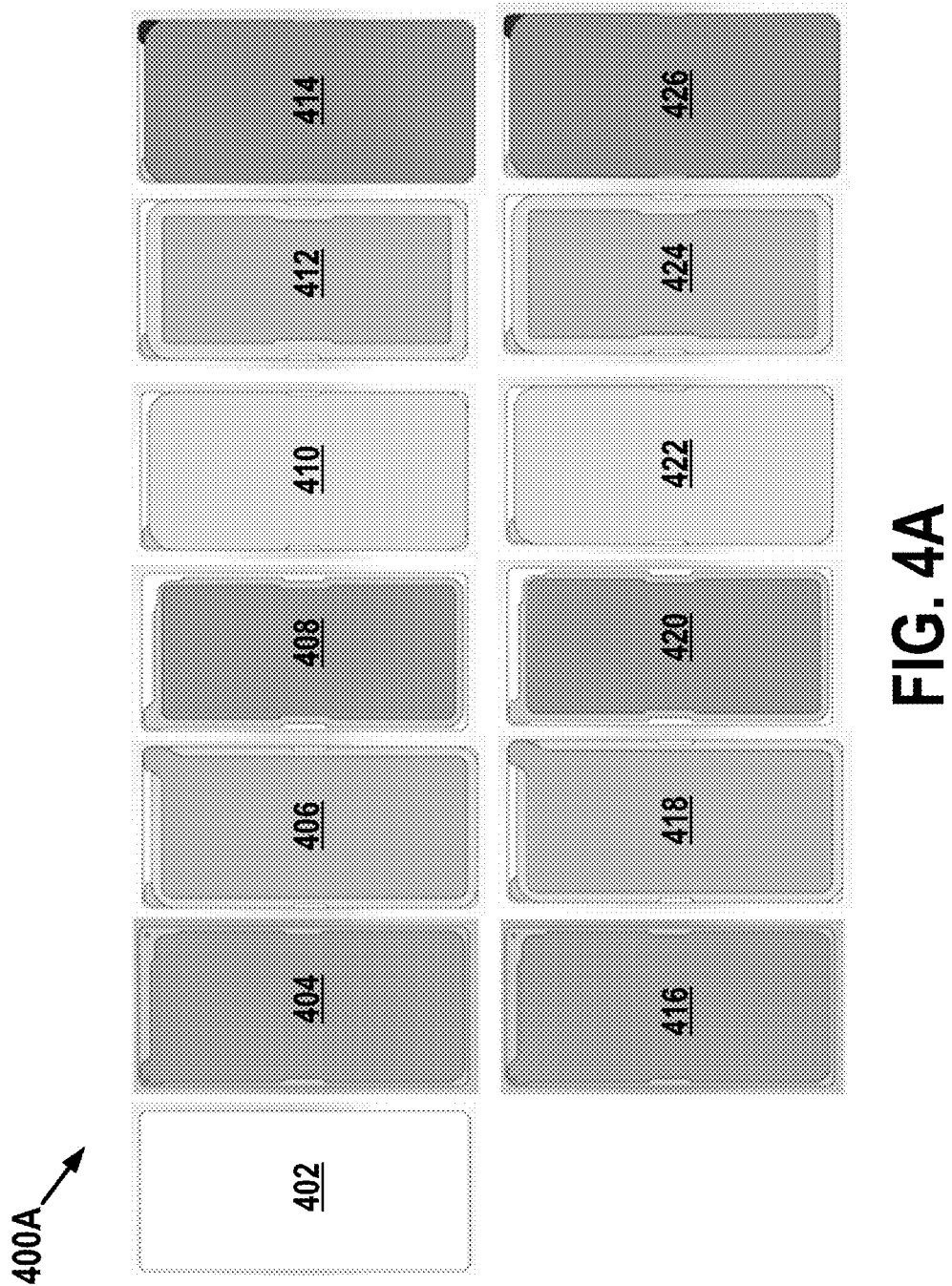

FORMING AN INTERCONNECTION FOR SOLID-STATE BATTERIES

BACKGROUND

Unless otherwise indicated herein, the materials described in this section are not prior art to the claims in this application and are not admitted to be prior art by inclusion in this section.

Lithium-ion and lithium polymer batteries are generally composed of a lithium cobalt oxide ($LiCoO_2$) cathode, a graphite anode, a polymer separator, and a liquid electrolyte. One drawback of these lithium-ion and lithium polymer batteries is that the liquid electrolyte presents safety issues. In some instances, the liquid electrolyte may become flammable if a short occurs between the anode and cathode of the battery (e.g., due to defects or mishandling). Another drawback of conventional lithium-ion and lithium polymer batteries is that, because these batteries have a high ratio of inactive materials (e.g., polymer separator, liquid electrolyte) to active materials (e.g., $LiCoO_2$ cathode and graphite anode), they have a limited energy density of approximately 500-550 Wh/L.

Solid-state batteries can provide an improvement over conventional lithium-ion and lithium polymer batteries in both energy density and safety. Solid-state batteries are typically composed of a $LiCoO_2$ cathode, a lithium anode, and a solid-state lithium phosphorous oxynitride (LiPON) electrolyte, which also acts as a separator. The lithium anode has a theoretical specific capacity of approximately 3800 mAh/g (as compared with the graphite anode used in lithium-ion and lithium polymer batteries, which has a theoretical specific capacity of only approximately 372 mAh/g), which allows for an increased energy density of solid-state batteries.

Because solid-state batteries use a solid-state electrolyte, rather than a liquid electrolyte, solid-state batteries may avoid the safety issues that lithium-ion and lithium polymer batteries do.

SUMMARY

Example embodiments herein disclose the use of one or more lasers to form channels through a solid-state battery. Furthermore, a method of manufacturing a solid-state battery is provided in which interconnections are formed through the solid-state battery, such that conventional connectors and tabs are not required. Forming interconnections through solid-state battery cells in parallel or in series eliminates the use of conventional connectors and tabs. In some embodiments, a laser may be used to penetrate (e.g., drill, puncture, perforate) and/or create a hole through one or more battery cells.

Disclosed herein are batteries with a substrate including a first side and a second side, where a first cathode current collector and a first anode current collector are on the first side of the substrate, and where a second cathode current collector and a second anode current collector are on the second side of the substrate. Further, the battery may include a first channel through the substrate between the first cathode current collector and the second cathode current collector. Yet further, the battery may include a second channel through the substrate between the first anode current collector and the second anode current collector. In addition, the battery may include a cathode interconnection, via the first channel, between the first cathode current collector and the second cathode current collector. In addition, the battery may include an anode interconnection, via the second channel, between the first anode current collector and the second anode current collector.

Also disclosed are methods of manufacturing a battery. In some embodiments, a method may include providing on a first side of a substrate a first cathode current collector and a first anode current collector. Further, the method may include providing on a second side of the substrate a second cathode current collector and a second anode current collector. Yet further, the method may include using at least one laser to form: (a) a first channel through the substrate, wherein the first channel is between the first cathode current collector and the second cathode current collector, and (b) a second channel through the substrate, where the second channel is between the first anode current collector and the second anode current collector. In addition, the method may include forming a cathode interconnection, via the first channel, between the first cathode current collector and the second cathode current collector. In addition the method may include forming an anode interconnection, via the second channel, between the first anode current collector and the second anode current collector.

Also disclosed are methods of manufacturing a number of solid-state batteries. In some embodiments, a method may include providing a roll comprising a number of substrates, where for each substrate in the plurality of substrates: (1) forming on a first side of the substrate a first cathode current collector and a first anode current collector, and forming on a second side of the substrate a second cathode current collector and a second anode current collector; (2) forming on the first side of the substrate a first cathode, and forming on the second side of the substrate a second cathode; (3) annealing the first cathode and the second cathode at a temperature; (4) forming on the first side of the substrate a first solid-state electrolyte, and forming on the second side of the substrate a second solid-state electrolyte; (5) forming on the first side of the substrate a first anode, and forming on the second side of the substrate a second anode; and (6) forming a cathode interconnection between the first cathode current collector and the second cathode current collector, and forming an anode interconnection between the first anode current collector and the second anode current collector.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIGS. 4A to 4C illustrates aspects of forming an interconnection in solid-state batteries, in accordance with some embodiments.

DETAILED DESCRIPTION

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

Connecting solid-state batteries in parallel or in series can present several challenges. In some instances, connecting a battery in parallel or in series generally requires a connector for each lead of the battery. When connecting multiple batteries, the number of connectors increases rapidly, possibly adversely affecting performance. For example, using multiple connectors may present difficulties in maintaining energy density, and at the same time, increasing the impedance of the batteries and thus, diminishing discharge performance. In additional aspects, such connectors may require tabs that take up additional space in circuitry (e.g., board space) and increase costs associated with added hardware.

Example embodiments may help to provide the benefit of solid-state batteries, while reducing or eliminating the drawbacks described above. In particular, example embodiments disclose the use of one or more lasers to form channels through the solid-state battery. Furthermore, a novel method of manufacturing such battery cells is provided in which interconnections are formed through the solid-state battery, such that conventional connectors and tabs are not required. Forming interconnections through solid-state battery cells in parallel or in series eliminates the use of conventional connectors and tabs. In some embodiments, a laser may be used to penetrate (e.g., drill, puncture, perforate) and/or create a hole through one or more battery cells.

Figure 1A:
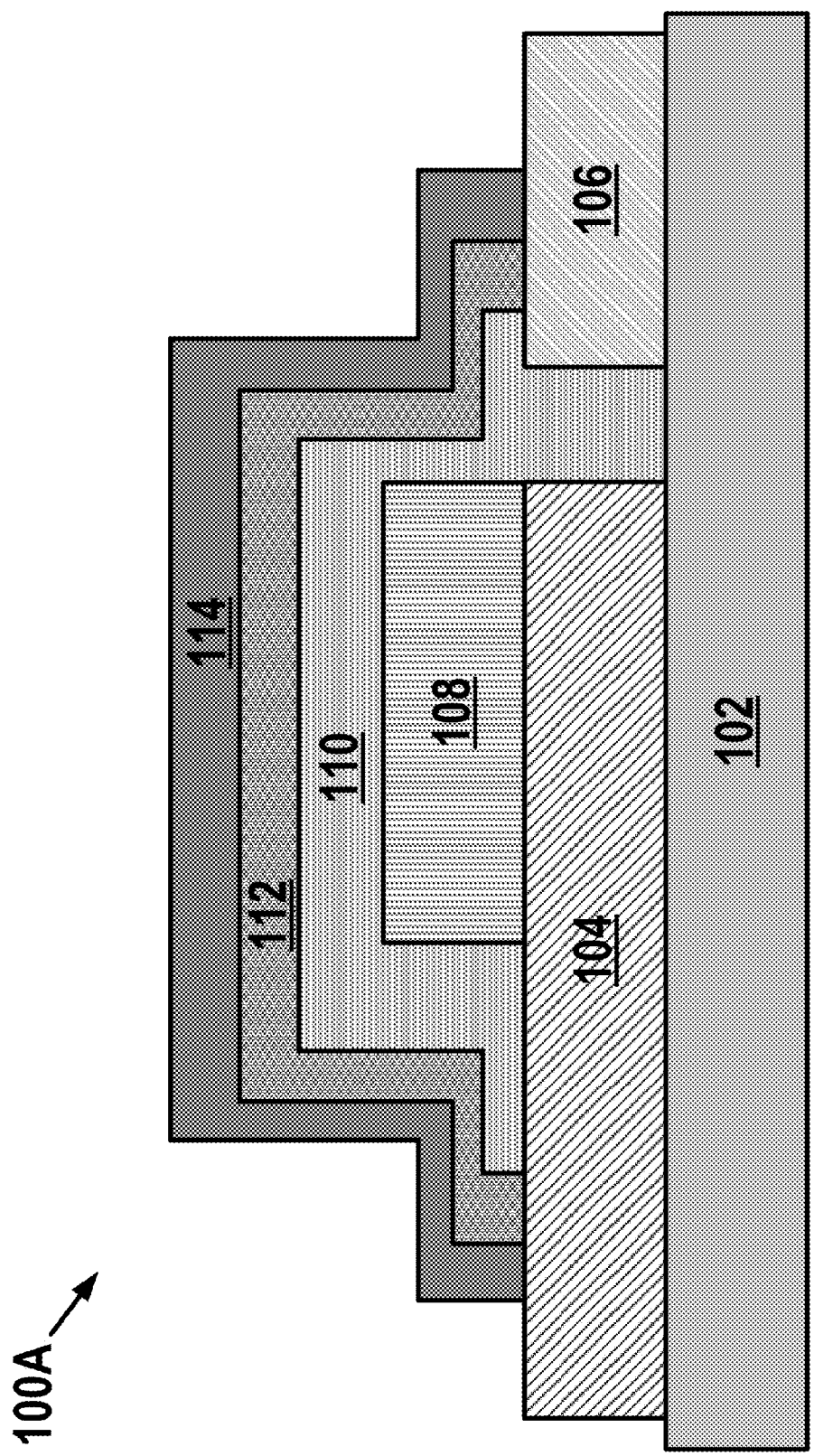
FIGS. 1A to 1C illustrate example solid-state batteries, in accordance with some embodiments.

FIG. 1A illustrates an example solid-state battery 100A, in accordance with an example embodiment. For example, the solid-state battery 100A may be used to power a head-mountable device. FIG. 1A illustrates an example side or a cross-sectional view of the solid-state battery 100A. As shown, the solid-state battery 100A includes a substrate 102, a first cathode current collector 104, a first anode current collector 106, a first cathode 108, a first solid-state electrolyte 110, a first anode 112, and a first protective coating 114.

The substrate 102 may be formed of materials such as glass, semiconductors, mica, or possibly other non-conducting materials. In some embodiments, substrate 102 may be formed with copper, stainless steel, and/or polyimide. Yet further, in some embodiments, substrate 102 may be formed of yttria-stabilized zirconia (YSZ), a flexible ceramic that can withstand high temperatures.

The substrate 102 may take any number of dimensions. In some embodiments, the substrate 102 may have a thickness between, for example, about 20 μm and about 40 μm. Other thicknesses are possible as well. The dimensions of the substrate 102, including, for example, a planar area and the thickness of the substrate 102, may vary by application of the solid-state battery 100A.

The first cathode current collector 104 and the first anode current collector 106 may each be formed of one or more electrically conductive materials. In some embodiments, one or both of the first cathode current collector 104 and the first anode current collector 106 may be formed by one or more of cobalt, gold, stainless steel, and nickel. In some embodiments, one or both of the first cathode current collector 104 and the first anode current collector 106 may take the form of a sheet, a foil, or a powder. Other materials and forms are possible as well.

The first cathode current collector 104 and the first anode current collector 106 may each take any number of dimensions. In some embodiments, one or both of the first cathode current collector 104 and the first anode current collector 106 may have a thickness between, for example, about 3 μm and about 4 μm. Other thicknesses are possible as well. The dimensions of the first cathode current collector 104 and the first anode current collector 106, including, for example, planar areas and the thicknesses of the first cathode current collector 104 and the first anode current collector 106, may vary by application of the solid-state battery 100A.

As shown, the first cathode 108 is in electrical contact with the first cathode current collector 104. The first cathode 108 may be formed of, for example, $LiCoO_2$. Other cathode materials are possible as well. The first cathode 108 may take any number of dimensions. In some embodiments, the first cathode 108 may have a thickness between, for example, about 5 μm and about 15 μm. Other thicknesses are possible as well. As a general matter, a greater thickness of the first cathode 108 may be grown on substrate 102 formed with YSZ compared to the substrate 102 formed with other materials such as copper, polyimide, and stainless steel. The dimensions of the first cathode 108, including, for example, a planar area and thickness of the first cathode 108, may vary by application of the solid-state battery 100A.

As shown, the first solid-state electrolyte 110 may be formed between the first cathode 108 and the first anode 112. In some embodiments, the first solid-state electrolyte may be formed of lithium phosphorous oxynitride (LiPON). Other solid-state electrolyte materials are possible as well. The first solid-state electrolyte 110 may take any number of dimensions within the solid-state battery 100A. In some embodiments, the first solid-state electrolyte 110 may have a thickness between, for example, about 1 μm and 3 μm. Other thicknesses are possible as well. The dimensions of the first solid-state electrolyte 110, including, for example, a planar area and the thickness of the first solid-state electrolyte 110, may vary by application of the solid-state battery 100A.

As shown, the first anode 112 is in electrical contact with the first anode current collector 106. The first anode 112 may be formed of, for example, lithium metal. Other anode materials are possible as well. The first anode 112 may take any number of dimensions. In some embodiments, the first anode 112 may have a thickness between, for example, about 2 μm to 4 μm. Other thicknesses are possible as well. The dimensions of the first anode 112, including, for example, a planar area and the thickness of the first anode 112, may vary by application of the solid-state battery 100A.

In some embodiments, the solid-state battery 100A may be connected to a circuit (such as, for example, the circuit of an electronic device and/or a head-mountable device). In some instances, the solid-state battery 100A may include one or more connectors (not shown in FIG. 1A) to establish an electrical connection between the first cathode current collector 104 and the circuit. Further, the first anode current collector 106 may include one or more other connectors (also not shown in FIG. 1A) to establish an electrical connection between the first anode current collector 106 and the circuit.

In some embodiments, the solid-state battery 100A may power a circuit. In some instances, the solid-state battery 100A may power a circuit by means of a chemical reaction between the first anode 112 and the first cathode 108. In particular, when the solid-state battery 100A is connected into the circuit, the first anode 112 may undergo an oxidation reaction in which ions from the first anode 112 move through the first solid-state electrolyte 110 towards the first cathode 108, resulting in the release of electrons from the first anode 112 into the circuit. Concurrently, when the solid-state battery 100A is connected into the circuit, the first cathode 108 may undergo a reduction reaction in which the ions moving through the first solid-state electrolyte 110 combine with the first cathode 108, resulting in the absorption at the first cathode 108 of the electrons released by the first anode 112 into the circuit. The release of the electrons at the anode 112 and absorption of the electrons at the first cathode 108 may produce an electrical current that powers the circuit.

In some embodiments, the solid-state battery 100A may further include a first protective coating 114, as shown in FIG. 1A. The first protective coating 114 may, for example, substantially cover the first anode 112, thereby protecting the solid-state battery 100A from contamination and extending the life of the solid-state battery 100A. In some embodiments, the protective coating 114, for example, may not cover portions of the first cathode current collector 104 and the first anode current collector 106, possibly to connect the solid-state battery 100A to a circuit. In some embodiments, the protective coating 114 may be formed of silicon dioxide ($SiO_2$), alumina, and/or a ceramic. Other protective coating materials are possible as well.

The solid-state battery 100A may take any number of dimensions. In some embodiments, for example, the solid-state battery 100A may have a thickness between about 30 μm and about 60 μm. Other thicknesses of the solid-state battery 100A are possible as well. The dimensions of the solid-state battery 100A, including, for example, a planar area and the thickness of the solid-state battery 100A, may vary by application of the solid-state battery 100A.

Figure 1B:
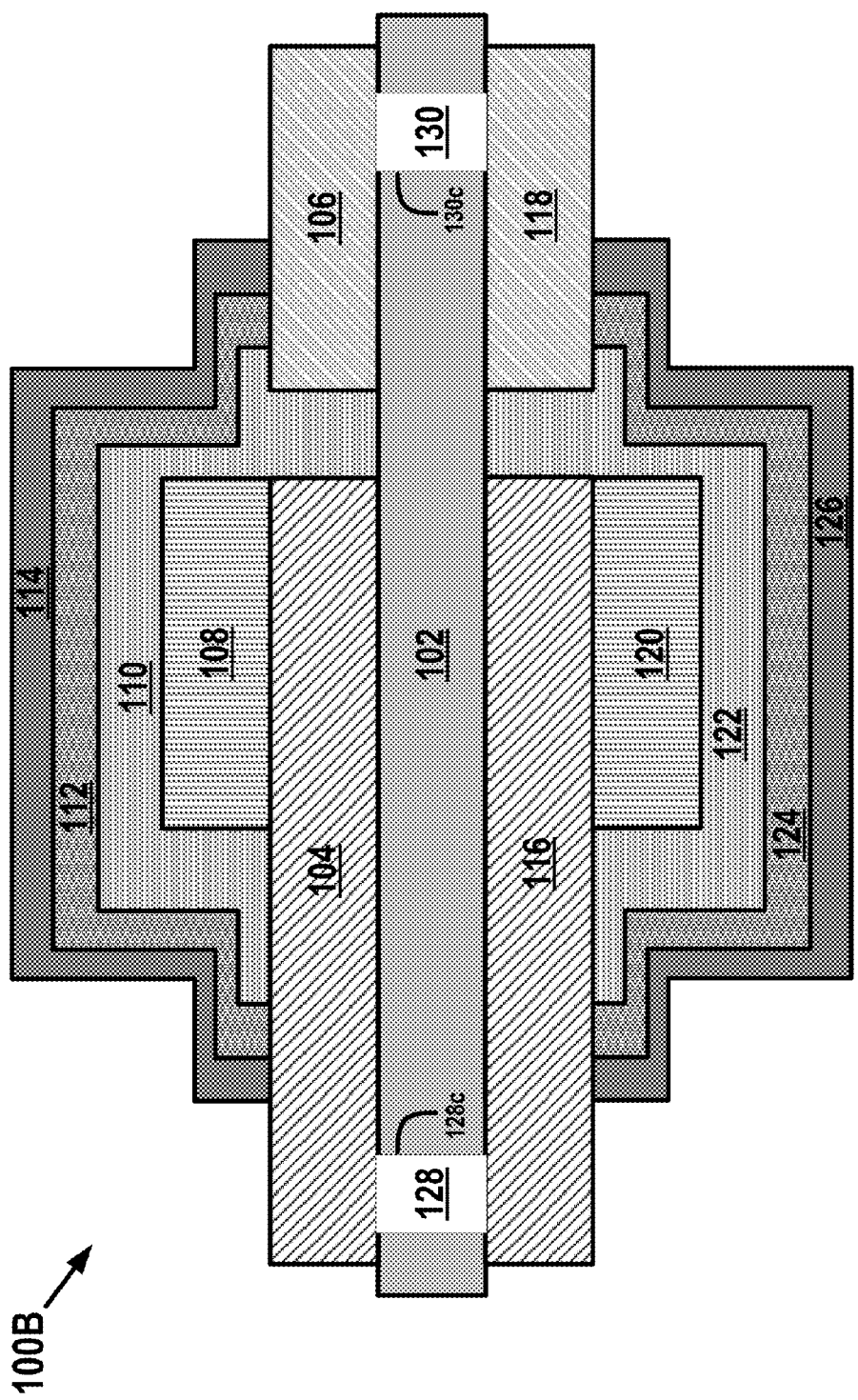

In some embodiments, possibly to improve an energy density of the solid-state battery 100, it may be desirable for a solid-state battery 100B to be a double-sided solid-state battery, as shown in FIG. 1B. FIG. 1B illustrates an example side or cross-sectional view of the solid-state battery 100B. In some embodiments, the solid-state battery 100B may be used to power a head-mountable device. As illustrated, the solid-state battery 100B includes the substrate 102 with a first side above the substrate 102 and a second side below the substrate 102. On the first side of the substrate 102, the solid-state battery 100B includes the first cathode current collector 104, the first anode current collector 106, the first cathode 108, the first solid-state electrolyte 110, and the first anode 112, as described in relation to FIG. 1A. Further, on the second side of the substrate 102, the solid-state battery 100B includes a second cathode current collector 116, a second anode current collector 118, a second cathode 120, a second solid-state electrolyte 122, and a second anode 124 that may take any of the forms described above for the first cathode current collector 104, the first anode current collector 106, the first cathode 108, the first solid-state electrolyte 110, and the first anode 112, respectively, in relation to FIG. 1A.

In some embodiments, the components on the first side of the substrate 102 (including, for example, the first cathode current collector 104, the first anode current collector 106, the first cathode 108, the first solid-state electrolyte 110, and the first anode 112) may be collectively referred to as an "upper" single-sided cell or battery. Yet further, the components on the second side of the substrate 102 (including, for example, the second cathode current collector 116, the second anode current collector 118, the second cathode 120, the second solid-state electrolyte 122, and the second anode 124) may be collectively referred to as a "lower" single-sided cell or battery. In some embodiments, the upper single-sided cell or battery of the solid-state battery 100B may be the solid-state battery 100A in relation to FIG. 1A.

In some embodiments, possibly to eliminate wires, soldering, and external tabs to connect solid-state batteries in series or parallel, interconnections may be formed in the solid-state battery 100B, as shown in FIG. 1B. As illustrated, the solid-state battery 100B includes a first channel 128c through the substrate 102 between the first cathode current collector 104 and the second cathode current collector 116. Further, the solid-state battery 100b includes a second channel 130c through the substrate 102 between the (first) anode current collector 106 and the second anode current collector 118.

In some embodiments, one or both of the first channel 128c and the second channel 130c may formed by a laser. Further, in some embodiments, the first channel 128c may be located in a first corner of the substrate 102 and the second channel 130c may be located in a second corner of the substrate 102 adjacent to the first corner of the substrate 102. The first channel 128c and the second channel 130c may also be located in other locations of the substrate 102 as well.

As illustrated in FIG. 1B, the solid-state battery 100B may include a cathode interconnection 128 and an anode interconnection 130. In some embodiments, the solid-state battery 100B may include the cathode interconnection 128, via the first channel 128c, between the first cathode current collector 104 and the second cathode current collector 116. Further, the solid-state battery 100B may include the anode interconnection 130, via the second channel 130c, between the first anode current collector 106 and the second anode current collector 118.

In some embodiments, the cathode interconnection 128 and the anode interconnection 130 may form electrical connections within the solid-state battery 100B. In some embodiments, the cathode interconnection 128 and the anode interconnection 130 may be formed of silver, gold, copper, antimony, tin, or a combination thereof. In some embodiments, the cathode interconnection 128 and the anode interconnection 130 may include conductive materials such as an ink, a paste, an epoxy, a wire, a cable, and/or a connector. Thus, the cathode interconnection 128 may establish an electrical connection between the cathode current collector 104 and the second cathode current collector 116. Further, the anode interconnection 130 may establish an electrical connection between the anode current collector 106 and the second anode current collector 118. Other interconnections in the solid-state battery 100B are possible as well.

In some embodiments, the solid-state battery 100B may be connected to a circuit (such as, for example, the circuit of an electronic device and/or a head-mountable device). In some instances, one or more connectors (not shown in FIG. 1B) may establish an electrical connection between any of the cathode current collectors (the cathode current collector 104 and the second cathode current collector 116) and the circuit. Further, one or more other connectors (also not shown in FIG. 1B) may establish an electrical connection between any of the anode current collectors (the anode current collector 106 and the second anode current collector 118) and the circuit. Thus, the solid-state battery 100B may power the circuit by means of a chemical reaction in the upper single-sided cell as described in relation to FIG. 1A and similarly in the lower single-sided cell.

In some embodiments, the solid-state battery 100B may further include a first protective coating 114 and a second protective coating 126, as shown in FIG. 1B. The first protective coating and the second protective coating 126 may, for example, substantially cover the first anode 112 and the second anode 124, thereby protecting the solid-state battery 100B from contamination and extending the life of the solid-state battery 100B. In some embodiments, the first protective coating 114 and the second protective coating 126, for example, may not cover portions of the first cathode current collector 104 and the first anode current collector 106, the second cathode current collector 116, and the second anode current collector 118, possibly to connect the solid-state battery 100B to a circuit. In some embodiments, the first protective coating 114 and the second protective coating 126 may be formed of $SiO_2$, alumina, and/or a ceramic. Other protective coating materials are possible as well.

The solid-state battery 100B may take any number of dimensions. In some embodiments, for example, the solid-state battery 100B may have about twice the thickness of a single-sided cell or battery. In some embodiments, the solid-state battery 100B may have a thickness of about 40 μm and about 80 μm. Other thicknesses of solid-state battery 100B are possible as well. The dimensions of solid-state battery 100B, including, for example, a planar area and the thickness of the solid-state battery 100B, may vary by application of the solid-state battery 100B.

Figure 1C:
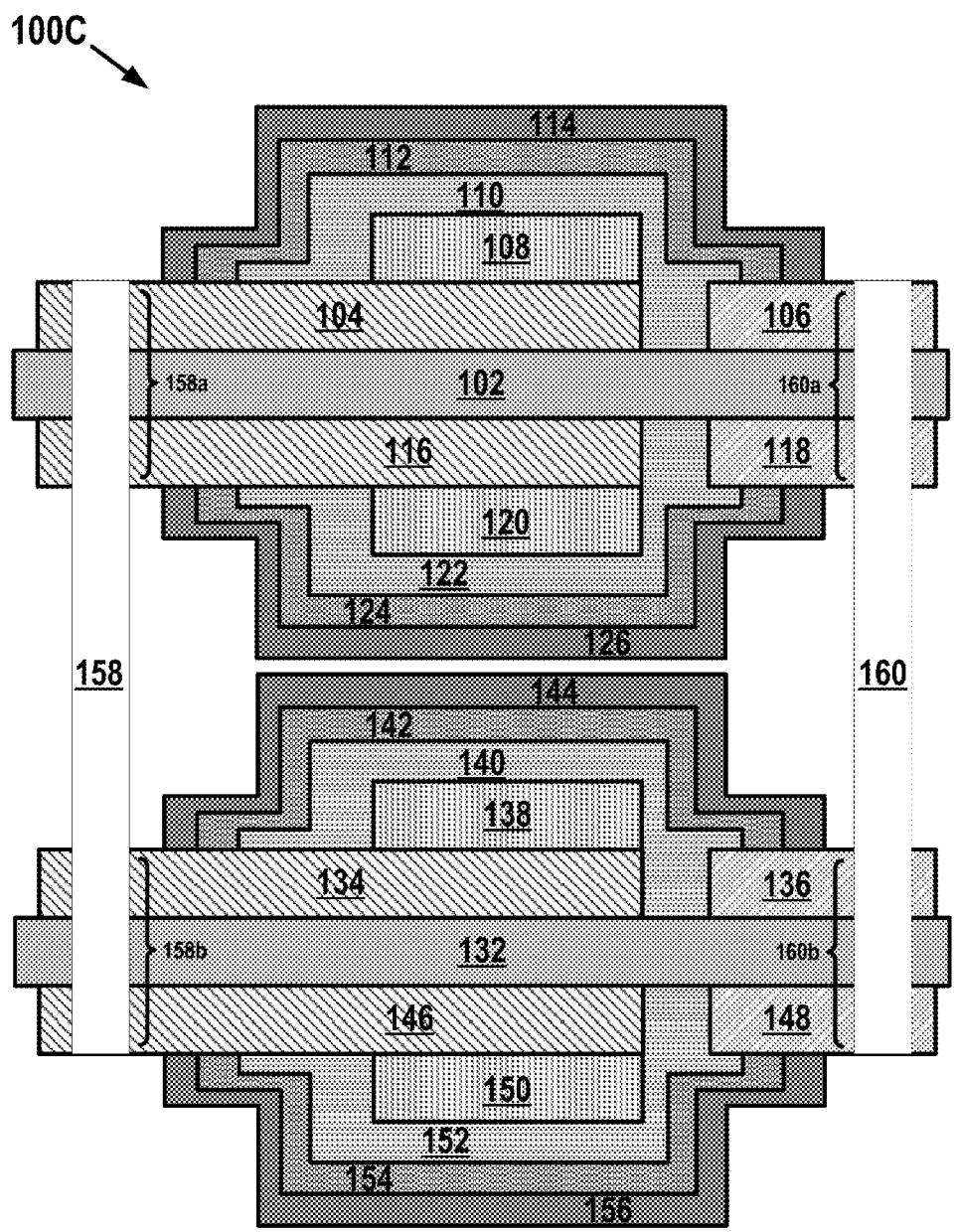

In some embodiments, possibly to further improve an energy density of a solid-state battery, it may be desirable for a solid-state battery 100C to include multiple double-sided batteries, as shown in FIG. 1C. FIG. 1C illustrates an example side or cross-sectional view of the solid-state battery 100C. In some embodiments, the solid-state battery 100C may be used to power a head-mountable device. As illustrated, FIG. 1C shows two double-sided batteries, where a first double-sided battery (shown on top) is aligned and stacked with a second double-sided battery (shown on the bottom). In some instances, an insulator that is about 25 μm thick may be placed between the first double-sided battery and the second double-sided battery. It should be understood that the first double-battery and the second double-battery may also be connected without stacking, possibly by other arrangements.

Further, as illustrated in FIG. 1C, the first double-sided battery may include the substrate 102 with a first side above the substrate 102 and a second side below the substrate 102, as described in relation to FIG. 1B. On the first side the substrate 102, the first double-sided battery may include the first cathode current collector 104, the first anode current collector 106, the first cathode 108, the first solid-state electrolyte 110, and the first anode 112, that may take any of the forms described above in relation to FIGS. 1A and 1B. Further, on the second side, the first double-sided battery may also include the second cathode current collector 116, the second anode current collector 118, the second cathode 120, the second solid-state electrolyte 122, and the second anode 124 that may take any of the forms described for the cathode current collector 104, the anode current collector 106, the cathode 108, the solid-state electrolyte 110, and the anode 112, respectively, in relation to FIGS. 1A and 1B.

In addition, the second double-sided battery may include the second substrate 132 with a first side above the second substrate 132 and a second side below the second substrate 132. On the first side of the second substrate 132, the second double-sided battery may include a third cathode current collector 134, a third anode current collector 136, a third cathode 138, a third solid-state electrolyte 140, and a third anode 142 that may take any of the forms described above for the first cathode current collector 104, the first anode current collector 106, the first cathode 108, the first solid-state electrolyte 110, and the first anode 112, respectively, in relation to FIGS. 1A through 1C.

Further, on the second side of the second substrate 132, the second double-sided battery may include a fourth cathode current collector 146, a fourth anode current collector 148, a fourth cathode 150, a fourth solid-state electrolyte 152, and a fourth anode 154 that may take any of the forms described for the second cathode current collector 116, the second anode current collector 118, the second cathode 120, the second solid-state electrolyte 122, and the second anode 124, respectively, in relation to FIGS. 1B and 1C.

In some embodiments, possibly to eliminate wires, soldering, and external tabs to connect the double-sided batteries connected in series or parallel, interconnections may be formed in the solid-state battery 100C, as shown in FIG. 1C. As illustrated, the solid-state battery 100C includes a first channel 158a through the substrate 102 between the first cathode current collector 104 and the second cathode current collector 116. Further, the solid-state battery 100C includes a second channel 160a through the substrate 102 between the first anode current collector 106 and the second anode current collector 118. In some embodiments, the first channel 158a and the second channel 160a may take any of the forms described above for channel 128c and 130c, respectively, in relation to FIG. 1B.

In some embodiments, one or both of the first channel 158a and the second channel 160a may formed by a laser. Further, in some embodiments, the first channel 158a may be located in a first corner of the substrate 102, and the second channel 160a may be located in a second corner of the substrate 102, adjacent to the first corner of the substrate 102.

Further, as illustrated, the solid-state battery 100C includes a third channel 158b through the second substrate 132 between the third cathode current collector 134 and the fourth cathode current collector 146, and a fourth channel 160b through the second substrate 132 between the third anode current collector 136 and the fourth anode current collector 148. In some embodiments, the third channel 158b and the fourth channel 160b may take any of the forms described above for the first channel 158a and the second channel 160b, respectively, in relation to FIG. 1C.

In some embodiments, one or both of the third channel 158b and the fourth channel 160b may formed by a laser. Further, in some embodiments, the third channel 158b may be located in a first corner of the second substrate 132, and the second channel 160a may be located in a second corner of the second substrate 132, adjacent to the first corner of the second substrate 132.

As illustrated in FIG. 1C, the solid-state battery 100C includes a cathode interconnection 158 and an anode interconnection 160 that may take the forms described above for cathode interconnection 128 and anode interconnection 130, respectively, in relation to FIG. 1B. Further, as illustrated, the solid-state battery 100C may include the cathode interconnection 158, via the first channel 158a, between the first cathode current collector 104 and the second cathode current collector 116. Yet further, the solid-state battery 100C may include the anode interconnection 160, via the second channel 160a, between the first anode current collector 106 and the second anode current collector 118.

In addition, as illustrated, the solid-state battery 100C may include the cathode interconnection 158, via the first channel 158b, between the third cathode current collector 134 and the fourth cathode current collector 146. Further, the solid-state battery 100C may include the anode interconnection 160, via the second channel 160b, between the third anode current collector 136 and the fourth anode current collector 148.

In some embodiments, the cathode interconnection 158 and the anode interconnection 160 may connect the first double-sided battery with the second double-sided battery. In particular, the cathode interconnection 158 may be formed through the cathode current collector 104, the substrate 102, the second cathode current collector 116, the third cathode current collector 134, the second substrate 132, and the fourth cathode current collector interconnection 146. Further, the anode interconnection 160 may be formed through the anode current collector 106, the second substrate 102, the second anode current collector 118, the third anode current collector 136, the second substrate 132, and the fourth anode current collector 148.

In some embodiments, the cathode interconnection 158 and the anode interconnection 160 may form electrical connections within the solid-state battery 100C. In some embodiments, the cathode interconnection 158 and the anode interconnection 160 may be formed of silver, gold, copper, antimony, tin, or a combination thereof. Further, the cathode interconnection 158 and the anode interconnection 160 may include conductive materials such as an ink, a paste, an epoxy, a wire, a cable, and/or a connector. In some embodiments, a conductive past or an epoxy may be used to fill the channels in the solid-state battery 100C and the remaining portions of the interconnections 158 and 160 may be wires or other connectors.

Thus, the cathode interconnection 158 may establish an electrical connection between cathode current collector 104, the second cathode current collector 116, the third cathode current collector 134, and the fourth cathode current collector interconnection 146. Further, the anode interconnection 160 may establish an electrical connection between the anode current collector 106, the second anode current collector 118, the third anode current collector 136, and the fourth anode current collector 148. Other interconnections in the multiple double-sided batteries are possible as well.

In some embodiments, the solid-state battery 100C may be connected to a circuit (such as, for example, the circuit of an electronic device and/or a head-mountable device). In some embodiments, one or more connectors (not shown in FIG. 1C) may establish an electrical connection between any of the cathode current collectors (the first cathode current collector 104, the second cathode current collector 116, the third cathode current collector 134, and the fourth cathode current collector 146) and the circuit. Further, one or more other connectors (also not shown in FIG. 1C) may establish an electrical connection between any of the anode current collectors (the first anode current collector 106, the second anode current collector 118, the third cathode current collector 136, and the fourth cathode current collector 148) and the circuit. Thus, the solid-state battery 100C may power the circuit by means of chemical reactions in the first double-sided battery and the second double-sided batter in manners described above in relation to FIGS. 1A and 1B.

In some embodiments, the solid-state battery 100C may include the first protective coating 114 and the second protective coating 126 that may take any of the forms described above in relation to FIGS. 1A and 1B. Further, the solid-state battery 100C may include the third protective coating 144 and the fourth protective coating 156 that may take any of the forms described above for the first protective coating 114 and the second protective coating 126, respectively, in relation to FIGS. 1A through 1C. The third protective coating 144 and the fourth protective coating 156 may, for example, substantially cover the third anode 142 and the fourth anode 154, respectively, thereby protecting the solid-state battery 100C from contamination and extending the life of the solid-state battery 100C.

In some embodiments, the third protective coating 144 and the fourth protective coating 156, for example, may not cover portions of the third cathode current collector 134, the third anode current collector 136, the fourth cathode current collector 146, and the fourth anode current collector 148, possibly to connect the solid-state battery 100C to a circuit.

The solid-state battery 100C may take any number of dimensions. In some embodiments, the solid-state battery 100C may take any number of dimensions depending on the number of double-sided batteries that may be interconnected. As illustrated in FIG. 1C, for example, solid-state battery 100C may have a thickness of two double-sided batteries or between about 80 μm and about 160 μm. Other thicknesses of the solid-state battery 100C are possible as well. The dimensions of solid-state battery 100C, including, for example, a planar area and the thickness of the solid-state battery 100C, may vary by application of the multiple double-sided batteries.

II. EXAMPLE METHODS FOR MANUFACTURING A SOLID-STATE BATTERY

Figure 2A:
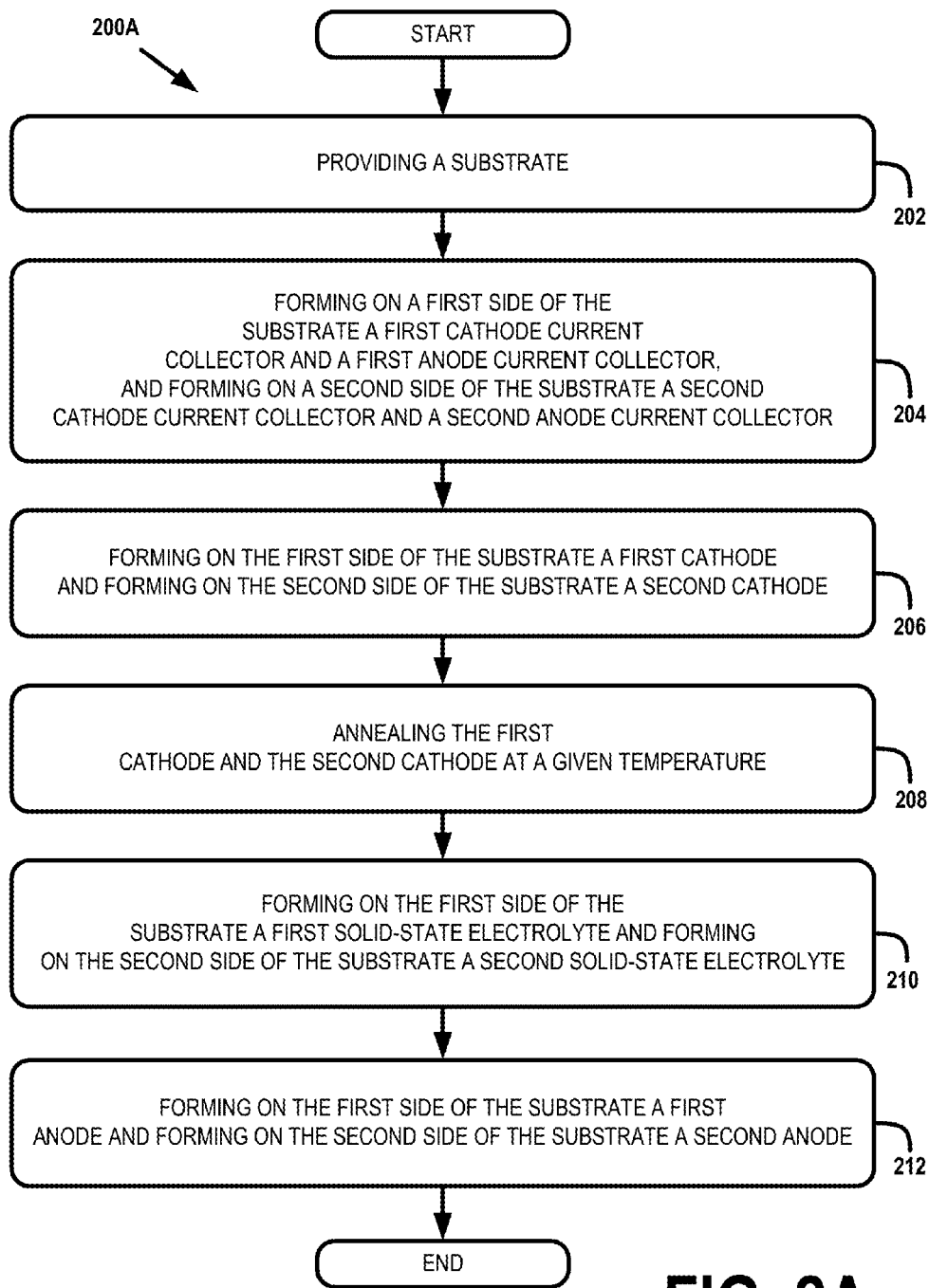
FIG. 2A is a flowchart describing a method manufacturing a solid-state battery, in accordance with some embodiments.

FIG. 2A is a flowchart describing a method of manufacturing a solid-state battery, in accordance with some embodiments. As shown, the method 200A begins at block 202 with providing a substrate. The substrate may, for example, take any of the forms described above for the substrate 102 in relation to FIGS. 1A through 1C and the second substrate 132 in relation to FIG. 1C.

In some embodiments, providing the substrate may involve acquiring a flexible ceramic. Further, providing the substrate may involve acquiring a manufactured substrate or a pre-manufactured substrate, such as the E-Strate® substrate manufactured by ENrG Inc. of Buffalo, N.Y. In some embodiments, providing the substrate may involve manufacturing a yttria-stabilized zirconia (YSZ) substrate. Further, for example, the substrate may be a stand-alone layer of YSZ, or may be a layer of YSZ attached to a layer of a metal or a ceramic. In some embodiments, the substrate may be cleaned with nitrogen and annealed at a temperature between about 700° C. and about 800° C. for about 2 to 4 hours. Further, the substrate may be examined for surface defects.

The method 200A continues at block 204 with forming on a first side of the substrate a first cathode current collector and a first anode current collector, and forming on a second side of the substrate a second cathode current collector and a second anode current collector. The first cathode current collector, the first anode current collector, the second cathode current collector, the second anode current collector may, for example, take any of the forms described above for the first cathode current collector 104, the first anode current collector 106, the second cathode current collector 116, and the second anode current collector 118, respectively, in relation to FIGS. 1B and 1C.

In some embodiments, one or more of the first cathode current collector, the first anode current collector, the second cathode current collector, the second anode current collector may be formed in advance, possibly involving adhering preformed anode and/or cathode current collectors to the substrate (e.g., using an adhesion layer between the substrate and the anode and/or cathode current collectors). The first cathode current collector, the first anode current collector, the second cathode current collector, the second anode current collector may also be examined for surface defects related to adhesion.

In addition, in some embodiments, forming one or more of the first cathode current collector, the first anode current collector, the second cathode current collector, the second anode current collector on the substrate may involve patterning (e.g., using lithography or photolithography) the anode and/or cathode current collectors onto the substrate. The first cathode current collector 104, the first anode current collector 106, the second cathode current collector 116, and the second anode current collector 118 may be formed concurrently, serially, and/or in groups. The anode and/or cathode current collectors may be formed in other manners as well.

The method 200A continues at block 206 with forming on the first side of the substrate a first cathode, and forming on the second side of the substrate a second cathode. The first cathode and the second cathode may, for example, take any of the forms described above for the first cathode 108 and the second cathode 120, respectively, in relation to FIGS. 1B and 1C. In some embodiments, forming the first cathode and the second cathode may involve, for example, depositing (e.g., sputtering) $LiCoO_2$ on the first cathode current collector to form the first cathode, and, respectively, on the second cathode current collector to form the second cathode. The first and second cathodes may be formed in other manners as well. The first cathode 108 and the second cathode 120 may be formed concurrently, serially, and/or in groups.

The method 200A continues at block 208 with annealing the first cathode and the second cathode at a temperature. As a general matter, annealing serves to improve a crystallization and crystal orientation of the first cathode and the second cathode. Further, annealing at a temperature between about 700° C. and about 800° C. may further serve to improve the crystallization and crystal orientation of the first cathode and the second cathode. The annealing may take place in, for example, an enclosed heating apparatus, such as a furnace, a rapid thermal annealing system, or a flash annealing system. The first cathode and the second cathode may also be examined for layer quality, composition, and defects related to adhesion. The first cathode and the second cathode may be annealed in other manners as well.

The method 200A continues at block 210 with forming on the first side of the substrate a first solid-state electrolyte and forming on the second side of the substrate a second solid-state electrolyte. The first solid-state electrolyte and the second solid-state electrolyte may, for example, take any of the forms described above for the first solid-state electrolyte 110 and the second solid-state electrolyte 120 in relation to FIGS. 1B and 1C. In some embodiments, the first solid-state electrolyte and the second solid-state electrolyte may be formed of LiPON. Further, forming the first solid-state electrolyte and the second solid-state electrolyte may involve using physical vapor deposition. For instance, the first solid-state electrolyte and the second solid-state electrolyte may be formed by positioning the substrate in a vacuum chamber facing a target of lithium phosphate ($Li_3PO_4$) and introducing nitrogen into the chamber, thereby forming a plasma facilitating deposition (e.g., sputtering) of LiPON. The first solid-state electrolyte and the second solid-state electrolyte may be examined for layer quality, conductivity, and possible defects. The first solid-state electrolyte and the second solid-state electrolyte may be formed concurrently, serially, and/or in groups. The solid-state electrolytes may be formed in other manners as well.

The method 200A continues at block 212 with forming on the first side of the substrate a first anode and forming on the second side of the substrate a second anode. The first anode may be in electrical contact with the first anode current collector, where the first solid-state electrolyte is formed between the first anode and the first cathode. Further, the second anode may be in electrical contact with the second anode current collector, where the second solid-state electrolyte is formed between the second anode and the second cathode. The first anode and the second anode may, for example, take any of the forms described above for the first anode 112 and the second anode 122, respectively, in relation to FIGS. 1A and 1C.

In some embodiments, the first anode and the second anode may be formed of LiPON. Further, forming the first anode may involve, for example, depositing (e.g., sputtering) lithium on the first anode current collector and the first solid-state electrolyte. Yet further, forming the second anode may involve, for example, depositing (e.g., sputtering) lithium on the second anode current collector and the second solid-state electrolyte. The first anode and the second anode electrolyte may be formed concurrently, serially, and/or in groups. The first anode and the second anode may be formed in other manners as well.

In some embodiments, the method 200A may further include forming on the first side of the substrate a first protective and forming on the second side of the substrate a second protective coating. The first protective coating may substantially cover the first anode and the second protective coating may substantially cover the second anode. The first protective coating and the second protective coating may, for example, take any of the forms described above for the first protective coating 114 and the second protective coating 126 in relation to FIGS. 1B and 1C. In some embodiments, no protective coating may be formed.

III. EXAMPLE METHODS OF FORMING AN INTERCONNECTION

Figure 2B:
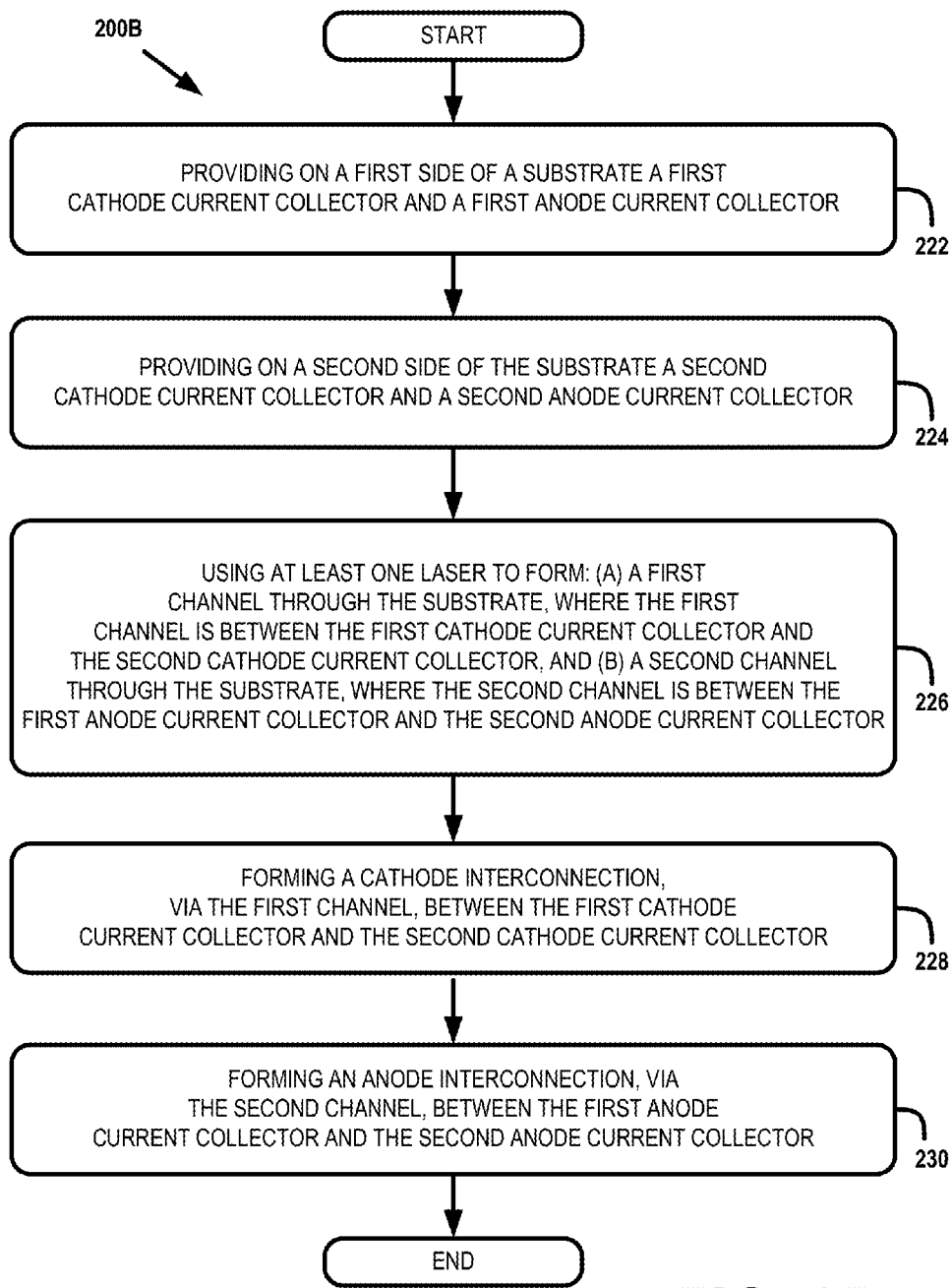
FIG. 2B is a flowchart describing a method of forming an interconnection, in accordance with some embodiments.

FIG. 2B is a flowchart describing a method of forming an interconnection, in accordance with some embodiments. In some embodiments, the method 200B may be carried out in relation to the method 200A in FIG. 2A. For example, the steps in the method 200A may be carried out and subsequently, the steps in the method 200B may be carried out. Further, one or more interconnections may be formed in a substrate, for example, as shown in the substrate 102 in FIG. 1B, and additional steps of the method 200A may be carried for manufacturing the solid-state battery 100B. Yet further, the steps in the method 200A may overlap with the steps in method 200B, among other possibilities.

As shown, the method 200B begins at block 222 with providing on a first side of a substrate a first cathode current collector and a first anode current collector. The substrate may, for example, have a first side and a second side by taking any of the forms described above for the substrate 102 in FIGS. 1A through 1C and the second substrate 132 in FIG. 1C. Further, the first cathode collector and the first anode current collector on the first side of the substrate may, for example, take any of the forms described above for the first cathode collector 104 and the first anode current collector 106 in FIGS. 1A through 1C.

The method 200B continues at block 224 with providing on a second side of the substrate a second cathode current collector and a second anode current collector. The second cathode current collector and the second anode current collector on the second side of the substrate may, for example, take any of the forms described above for the second cathode current collector 116 and the second anode current collector 118, respectively, in relation to FIGS. 1B and 1C.

The method 200B continues at block 226 with using at least one laser to form: (a) a first channel through the substrate, where the first channel is between the first cathode current collector and the second cathode current collector, and (b) a second channel through the substrate, where the second channel is between the first anode current collector and the second anode current collector.

In some embodiments, as illustrated in FIG. 1B, the laser may be used to form the first channel 128c through the substrate 102, where the first channel 128c is between the first cathode current collector 104 and the second cathode current collector 116. Further, the laser may be used to form the second channel 130c through the substrate 102, where the second channel 130c is between the first anode current collector 106 and the second anode current collector 118.

In some embodiments, as illustrated in FIG. 1C, the laser may be used to form the first channel 158a through the substrate 102, where the first channel 158a is between the first cathode current collector 104 and the second cathode current collector 116. Further, the laser may be used to form the second channel 160a through the substrate 102, where the second channel 130c is between the first anode current collector 106 and the second anode current collector 118. In some embodiments, as illustrated in FIG. 1C, the laser may be used to form the first channel 158b through the second substrate 132, where the first channel 158b is between the third cathode current collector 134 and the fourth cathode current collector 146. Further, the laser may be used to form the second channel 160b through the second substrate 132, where the second channel 160b is between the third anode current collector 136 and the fourth anode current collector 148.

In some embodiments, as illustrated by FIG. 1B, the laser may penetrate (e.g., drill, puncture, perforate) and/or create a hole for the first channel 128c and the second channel 130c in the substrate 102. In some instances, the laser may penetrate through the substrate 102 prior to steps described above for block 224 and block 226 of method 200B in FIG. 2B.

In some embodiments, as illustrated by FIG. 1C, the laser may penetrate (e.g., drill, puncture, perforate) and/or create a hole for the first channel 158a and the second channel 160a in the substrate 102 of the first double-sided battery. Yet further, as illustrated in FIG. 1C, the laser may penetrate and/or create a hole for the third channel 158b and the fourth channel 160b in the second substrate 132 of the second double-sided battery.

In some embodiments, as illustrated in FIG. 1C, the laser may penetrate (e.g., drill, puncture, perforate) and/or create a hole for the first channel 158a in the first cathode current collector 104, the substrate 102, and the second cathode current collector 116. Further, the laser may penetrate and/or create a hole for the second channel 160a in the first anode current collector 106, the substrate 102, and the second anode current collector 118. In some embodiments, the laser may penetrate and/or create a hole for the third channel 158b in the third cathode current collector 134, the second substrate 132, and the fourth cathode current collector 146. Yet further, the laser may penetrate and/or create a hole for the fourth channel 160b in the third anode current collector 136, the second substrate 132, and the fourth anode current collector 148.

The method 200B continues at block 228 with forming a cathode interconnection, via the first channel, between the first cathode current collector and the second cathode current collector. The cathode interconnection may, for example, take any of the forms described above for the cathode interconnection 128, via the first channel 128c, between the first cathode current collector 104 and the second cathode current collector 116 in relation to FIG. 1B.

Further, the cathode interconnection may, for example, take any of the forms described above for the cathode interconnection 158, via the first channel 158a, between the first cathode current collector 104 and the second cathode current collector 116 in relation to FIG. 1C. Yet further, the cathode interconnection may, for example, take any of the forms described above for the cathode interconnection 158, via the third channel 158b, between the third cathode current collector 134 and the fourth cathode current collector 146 in relation to FIG. 1C.

The method 200B continues at block 230 with forming an anode interconnection, via the second channel, between the first anode current collector and the second anode current collector. The anode interconnection may, for example, take any of the forms described above for the anode interconnection 130, via the second channel 130c, between the first anode current collector 106 and the second anode current collector 118 in relation to FIG. 1B.

Further, the anode interconnection may, for example, take any of the forms described above for the anode interconnection 160, via the second channel 160a, between the first anode current collector 106 and the second anode current collector 118 in relation to FIG. 1C. Yet further, the anode interconnection may, for example, take any of the forms described above for the anode interconnection 160, via the fourth channel 160b, between the third anode current collector 136 and the fourth anode current collector 148 in relation to FIG. 1C.

FIGS. 3A through 3F illustrate a method of manufacturing a solid-state battery, in accordance with some embodiments. Further, FIGS. 3A to 3F illustrate example side or cross-sectional views of manufacturing the solid-state battery 300. The method described for FIGS. 3A to 3F may correspond to, for example, the methods 200A and 200B described in relation to FIGS. 2A and 2B, respectively. In some embodiments, the solid-state battery 300 may be used to power a head-mountable device.

Figure 3A:
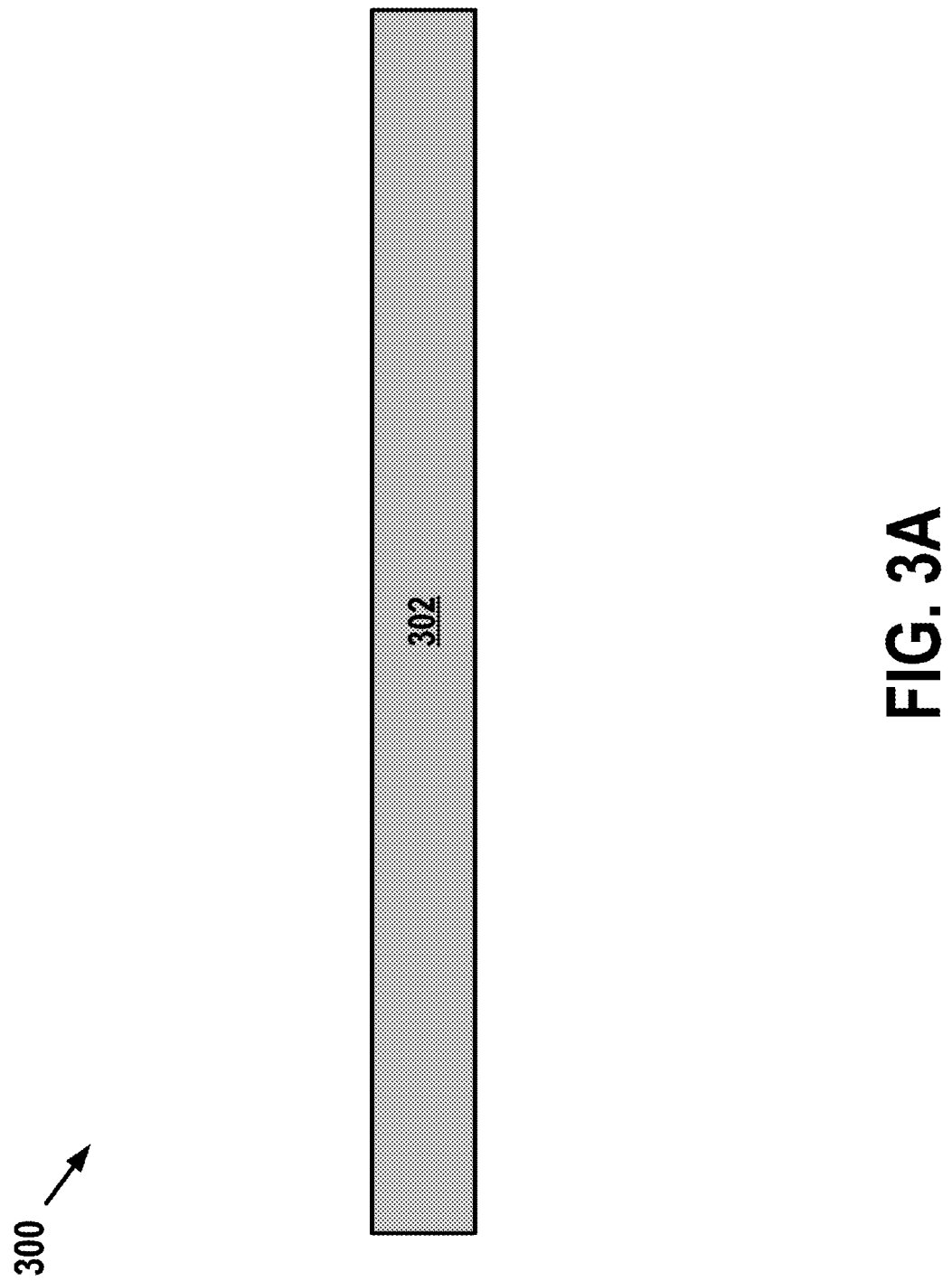
FIGS. 3A to 3G illustrate a method of manufacturing a solid-state battery, in accordance with some embodiments.

As shown in FIG. 3A, a substrate 302 is provided. The substrate 302 may, for example, take any of the forms described above for the substrate 102 in relation to FIGS. 1A through 1C and the second substrate 132 in relation to FIG. 1C. Further, the substrate 302 may be provided in any of the manners described above for block 202 of method 200A in FIG. 2A, and blocks 222 and 224 of method 200B in FIG. 2B.

Figure 3B:
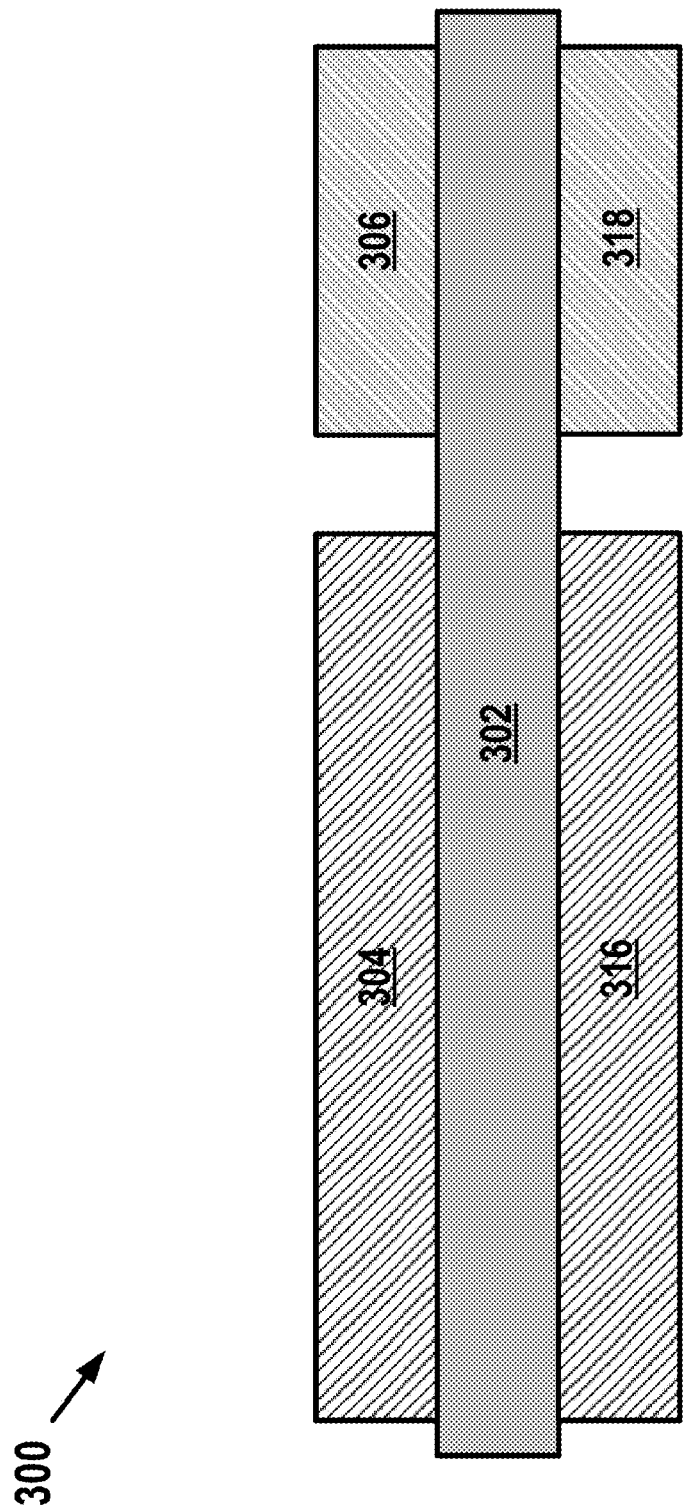

FIG. 3B illustrates providing on a first side of the substrate 302 a first cathode current collector 304 and a first anode current collector 306. Further, FIG. 3B illustrates providing on a second side of the substrate 302 a second cathode current collector 316 and a second anode current collector 318. The first cathode current collector 304, the first anode current collector 306, the second cathode current collector 316, and the second anode current collector 318 may take any of the forms described above for the first cathode current collector 104, the first anode current collector 106, the second cathode current collector 116, and the second anode current collector 118, in relation to FIGS. 1B and 1C.

Further, the first cathode current collector 304 and the first anode current collector 306 may be provided on the first side of substrate 302 in any manner described above for block 204 of method 200A in FIG. 2A and block 222 of method 200B in FIG. 2B. Further, the second cathode current collector 316 and the second anode current collector 318 may be provided on the second side of substrate 302 in any of the manners described above for block 204 of method 200A in FIG. 2A and block 224 of method 200B in FIG. 2B.

In some embodiments, the first cathode current collector 304, the second cathode current collector 316, the first anode current collector 306, and the second anode current collector 318 may be formed may be formed concurrently, serially, and/or in groups.

Figure 3C:
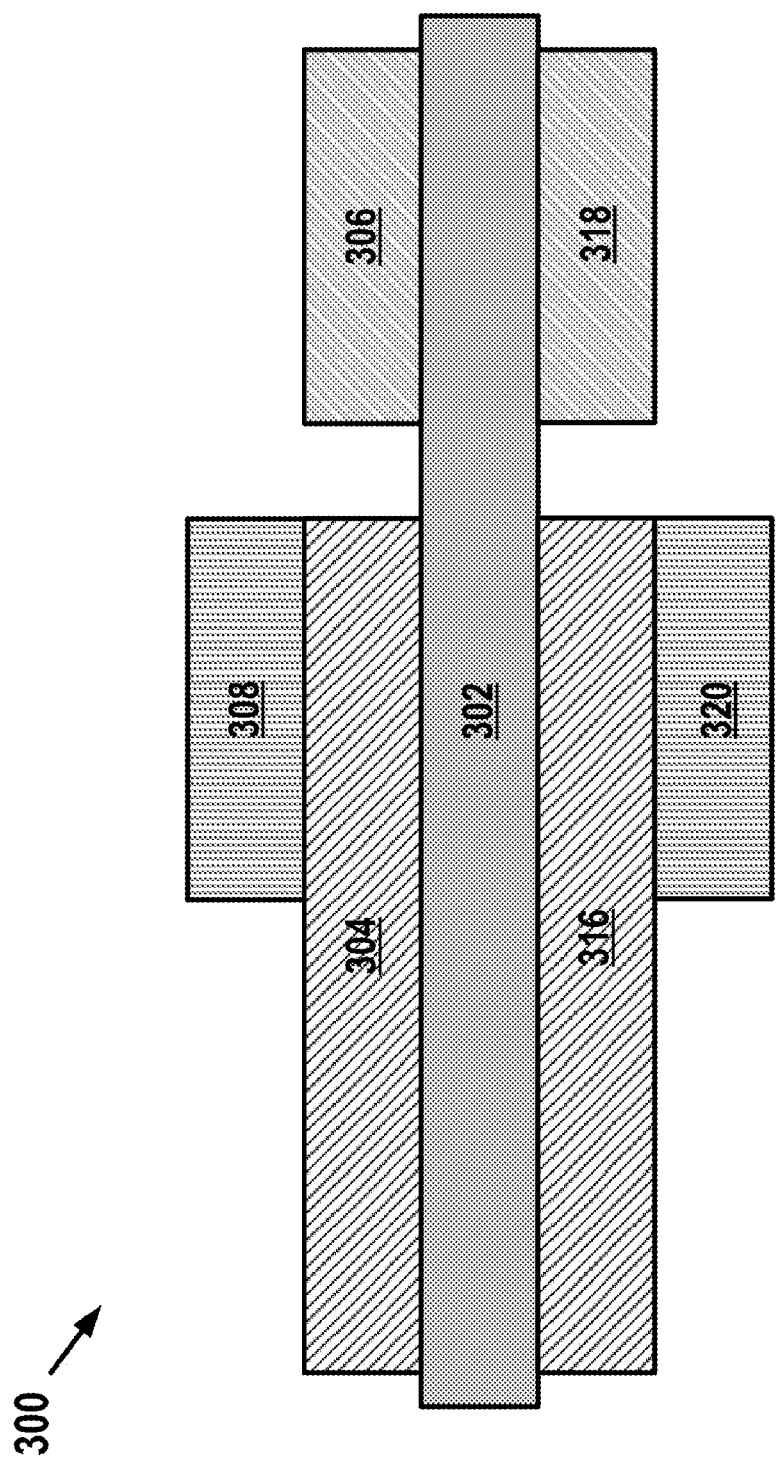

FIG. 3C illustrates the forming of first cathode 308 and second cathode 320, where one or both may be made of $LiCoO_2$. As shown, the cathode 308 is in electrical contact with the cathode current collector 304. Further, the second cathode 320 is in electrical contact with the first cathode current collector 316. The first cathode 308 and the second cathode 320 may take any of the forms described above for the first cathode 108 and the second cathode 320 in relation to FIGS. 1A through 1C. Further, the first cathode 308 and the second cathode 320 may be provided in any of the manners described above for block 206 of method 200A in FIG. 2A.

Additionally, the first cathode 308 and the second cathode 320 may be annealed (not shown) at a given temperature in any of the manners described above for block 208 of method 200A in FIG. 2A. In some embodiments, the first cathode 308 and the second cathode 320 may be formed concurrently, serially, and/or in groups.

Figure 3D:
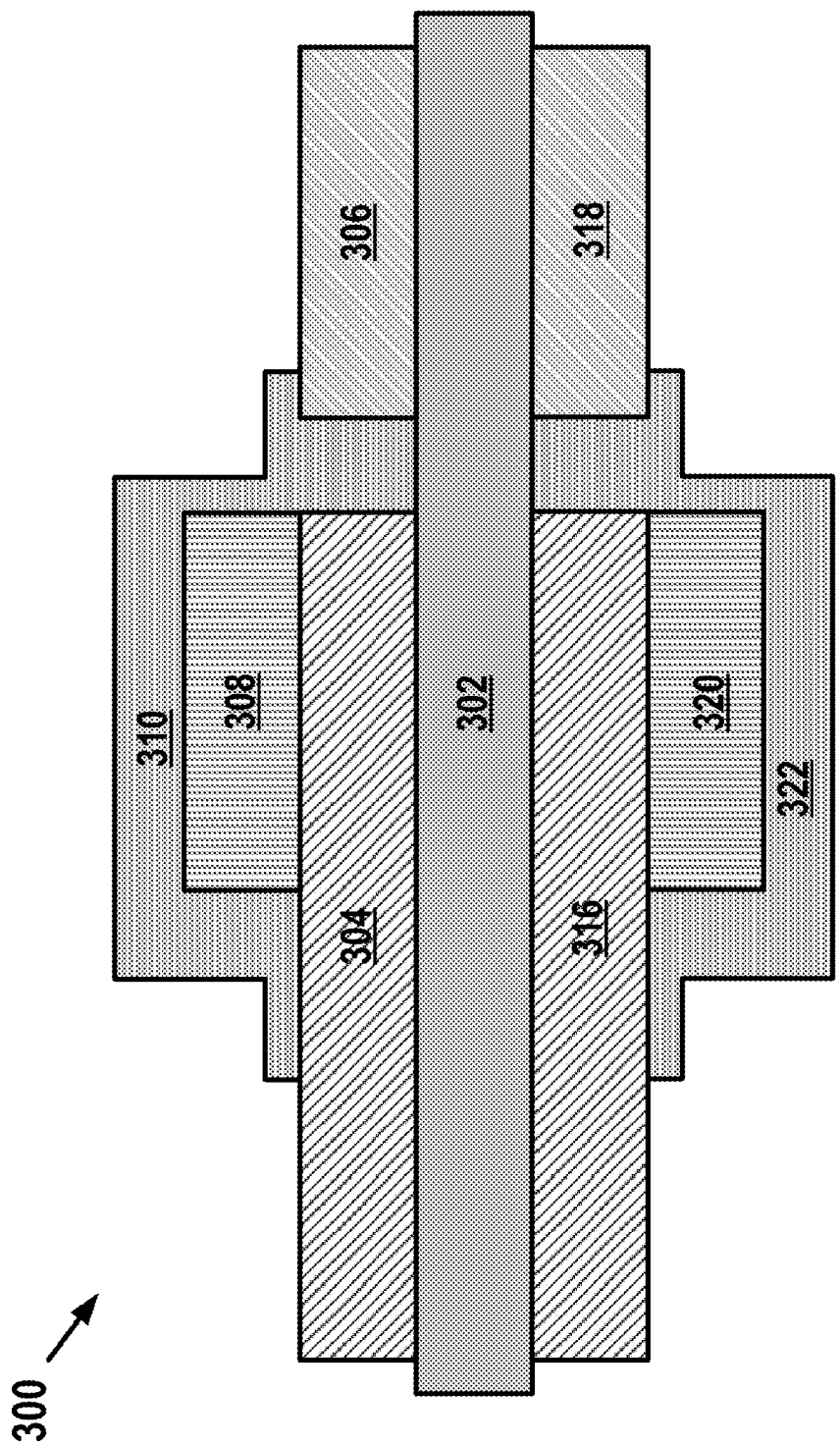

FIG. 3D illustrates the forming of a first solid-state electrolyte 310 and a second solid-state electrolyte 322, where one or both may be made of LiPON. The first solid-state electrolyte 310 and the second solid-state electrolyte 322 may take any of the forms described above for the first solid-state electrolyte 110 and the second solid-state electrolyte 122, respectively, in relation to FIGS. 1A through 1C. Further, the first solid-state electrolyte 110 and the second solid-state electrolyte 122 may be formed in any of the manners described above for block 210 of method 200A in FIG. 2A. In some embodiments, the first solid-state electrolyte 310 and the second solid-state electrolyte 322 may be formed concurrently, serially, and/or in groups.

Figure 3E:
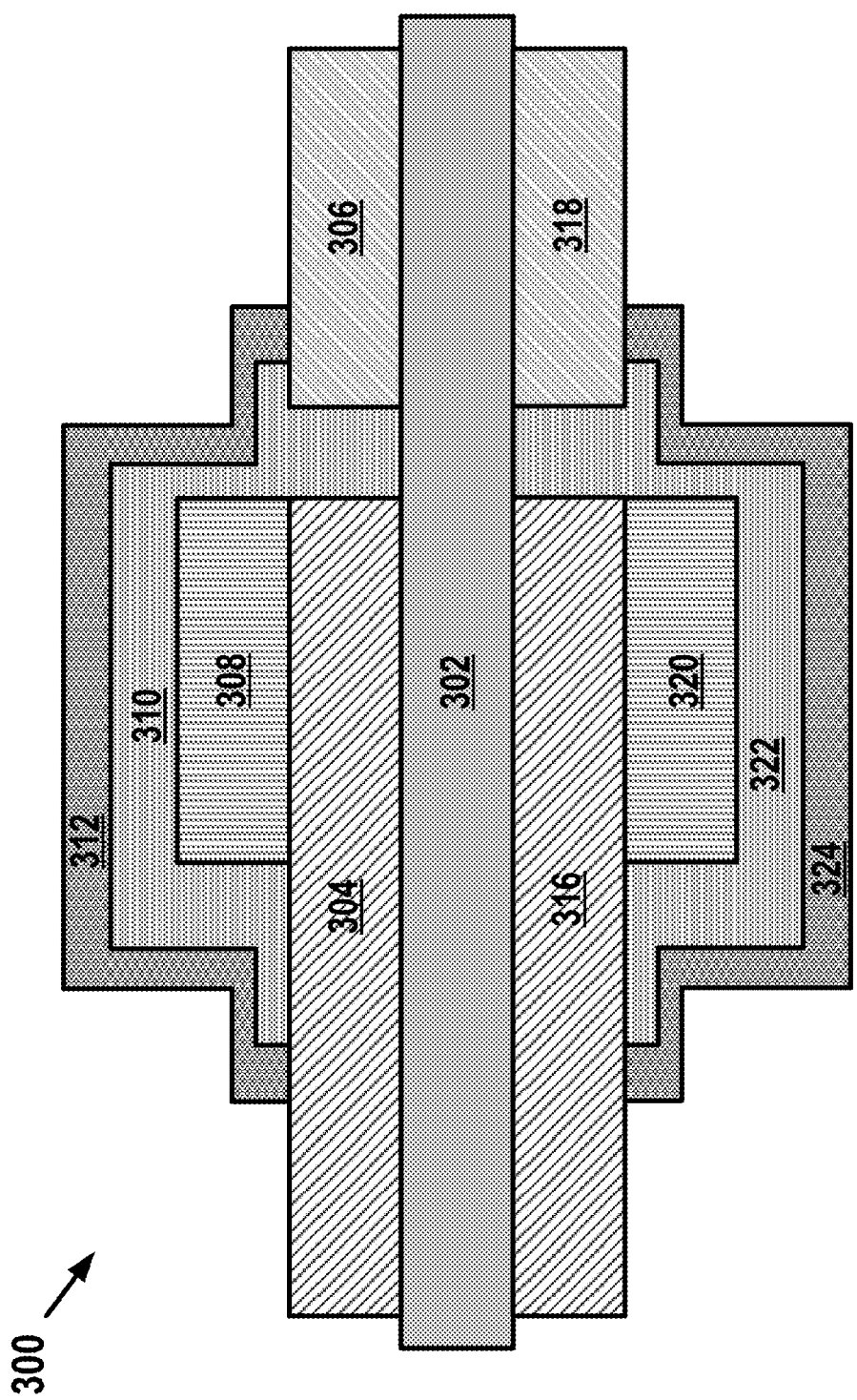

FIG. 3E illustrates the forming of a first anode 312 and a second anode 324, where one or both may be made of lithium. As shown, the first anode 312 is in electrical contact with the first anode current collector 306 and the second anode 324 is in electrical contact with the second anode current collector 318. Additionally, as shown, the solid-state electrolyte 310 is formed between the first cathode 308 and the first anode 312. Further, as shown, the second solid-state electrolyte 322 is formed between the second cathode 320 and the second anode 324.

The first anode 312 and the second anode 324 may take any of the forms described above for the first anode 112 and the second anode 124, respectively, in relation to FIGS. 1A through 1C. Further, the first anode 312 and the second anode 324 may be formed in any of the manners described above for block 212 of method 200A in FIG. 2A. In some embodiments, the first anode 312 and the second anode 324 may be formed concurrently, serially, and/or in groups.

Figure 3F:
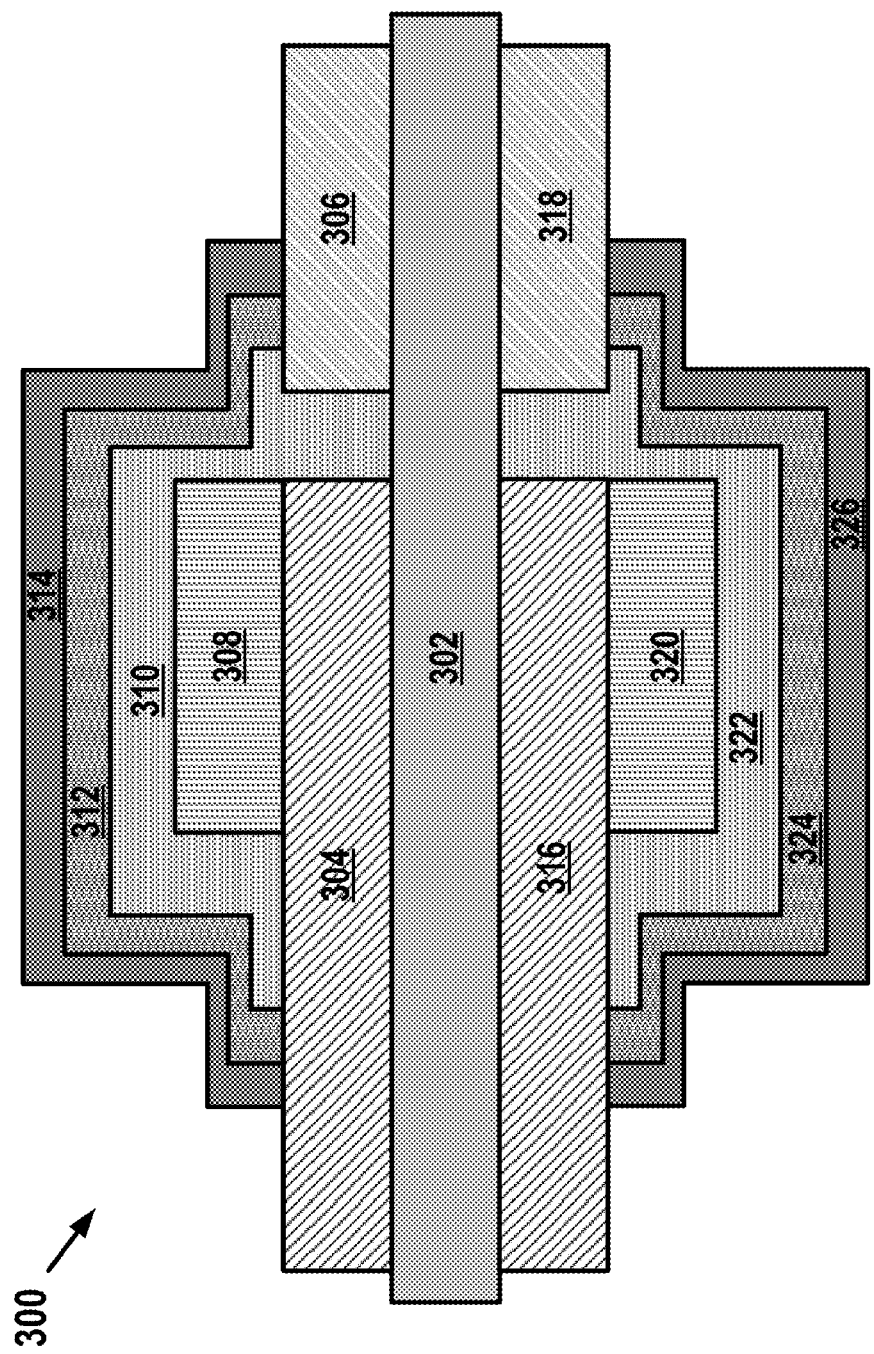

FIG. 3F illustrates the forming of a first protective coating 314 and a second protective coating 324 that substantially covers the first anode 310 and the second anode 320, respectively. The first protective coating 314 and the second protective coating 326 may, for example, take any of the forms described above for the first protective coating 114 and the second protective coating 124 in relation to FIGS. 1A through 1C. In some embodiments, the first protective coating 314 and the second protective coating 326 may be formed concurrently, serially, and/or in groups. In some embodiments, no protective coatings 314 and 324 may be formed.

Figure 3G:
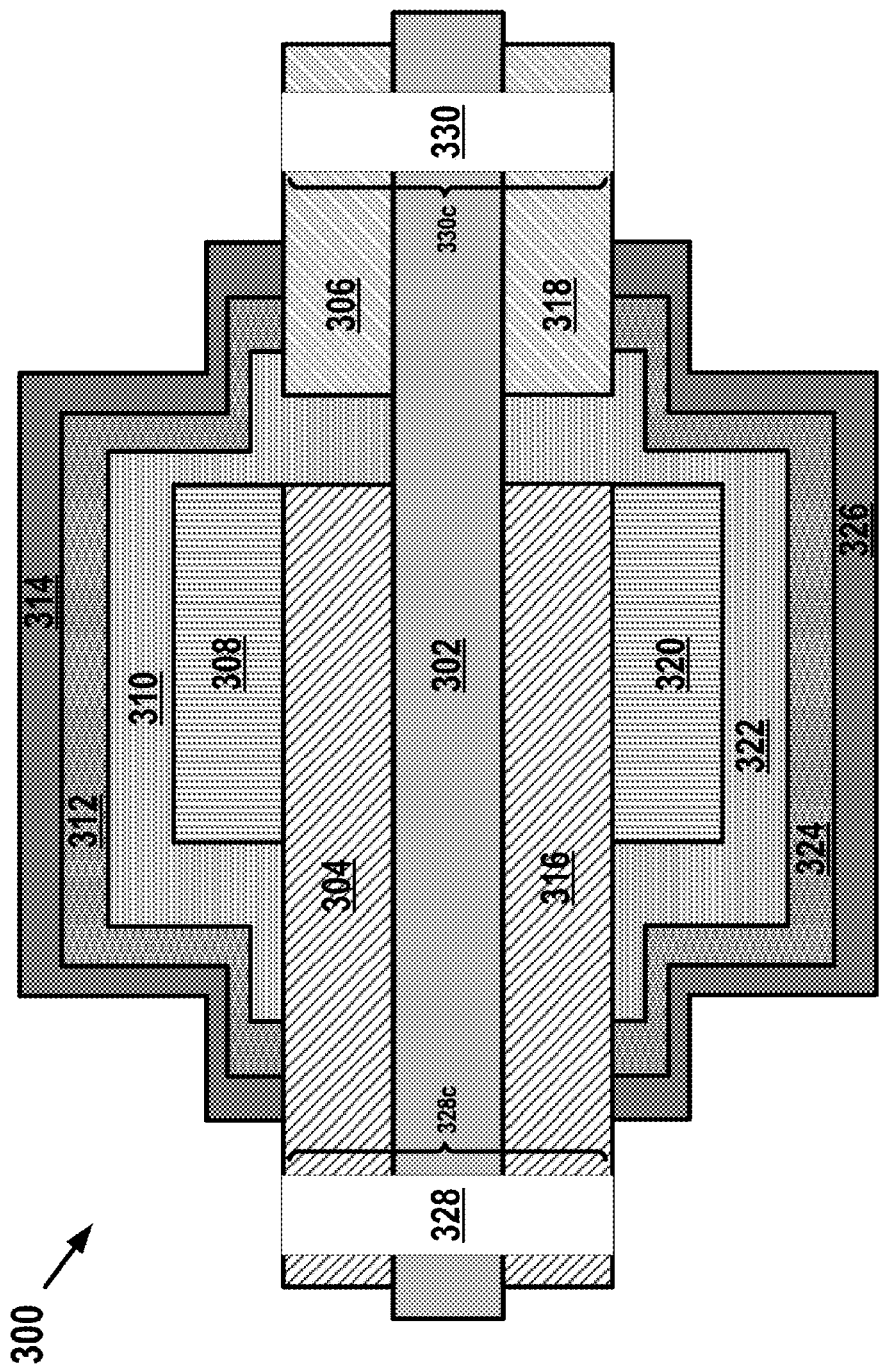

FIG. 3G illustrates a first channel 328c formed by a laser. The first channel 328c extends through the substrate 302, where the first channel 328c is between the first cathode current collector 304 and the second cathode current collector 316. As shown, the first channel 328c goes through the first cathode collector 304, the substrate 302, and the second cathode current collector 316. In some embodiments, the first channel 328c may, for example, take any of the forms described above for the first channel 128c in FIG. 1B, and the first channel 158a and the third channel 158b in FIG. 1C. Further, the laser that forms the first channel 328 may be used in any of the manners described above for block 226 of method 200B in FIG. 2B.

Further, FIG. 3G illustrates a second channel 330c formed by a laser. The second channel 330c extends through the substrate 302, where the second channel 330c is between the first anode current collector 306 and the second anode current collector 318. As shown, the second channel 330c goes through the first anode current collector 306 and the second anode current collector 318. The second channel 330c may, for example, take any of the forms described above for the second channel 130c in FIG. 1B, and the second channel 160a and the fourth channel 160b in FIG. 1C. Further, the laser that forms the second channel 130c may be used in any of the manners described above for block 226 of method 200B in FIG. 2B.

In some embodiments, the first channel 328c and the second channel 330c may be a hole or a space. Further, the first channel 328c and the second channel 330c may each have a diameter between about 152 μm and 360 μm, among other possibilities. In some embodiments, the first channel 328c and the second channel 330c may be formed concurrently, serially, and/or in groups. For example, the laser may be used to drill a hole or an area for the first channel 328c concurrently, serially, and/or in groups with other channels.

In some embodiments, other mechanisms (e.g., mechanical drilling devices) may also be used to form the first channel 328c and the second channel 330c.

In some embodiments, the laser may be used form the second channel 330c separately for each part or component of the solid-state battery 300. For example, the laser may be used to form the first channel 328c and the second channel 330c for the substrate 302 separately from other parts of the solid-state battery 300. In some embodiments, the laser may be used to form the first channel 328c and the second channel 330c separately for the cathode current collector 304, the second cathode current collector 316, the first anode current collector 306, and the second anode current collector 318. In some embodiments, mechanisms (e.g., clamps, locks, immobilizers, fasteners, holders, and compressors) may prevent motion of the solid-state battery 300 during use of the laser on the solid-state battery 300. Further, each use of the laser may be inspected by a microscope.

Yet further, FIG. 3G illustrates forming a cathode interconnection 328, via the first channel 328c, between the first cathode current collector 304 and the second cathode current collector 316. In addition, FIG. 3G illustrates forming an anode interconnection 330, via the second channel 330c, between the first anode current collector 306 and the second anode current collector 318. The cathode interconnection 328 and the anode interconnection 330 may, for example, take any of the forms described above for the cathode interconnection 128 and the anode interconnection 130 in relation to FIG. 1B, and the cathode interconnection 158 and the anode interconnection 160 in relation to FIG. 1C. Further, the cathode interconnection 328 and the anode interconnection 330 may be formed in any of the manners described above for block 228 and 230, respectively, in relation to FIG. 2B. In some embodiments, the cathode interconnection 328 and the anode interconnection 330 may be configured to connect the solid-state battery 300 to other solid-state batteries in parallel or in series.

In some embodiments, the cathode interconnection 328 may establish an electrical connection between the cathode current collector 304 and the second cathode current collector 316. Further, the anode interconnection 330 may establish an electrical connection between the anode current collector 306 and the second anode current collector 318. Additional interconnections (not shown in FIG. 3G) may also establish electrical connections between the solid-state battery 300 and other solid-state batteries.

In some embodiments, the solid-state battery 300 may be aligned and stacked with other solid-state batteries. In some embodiments, the solid-state battery 300 may be aligned and stacked before using conductive materials to form the cathode interconnection 328 and the anode interconnection 330. The solid-state battery 300 may be aligned and stacked as a first double-sided battery on top of a second double-sided battery, as illustrated in FIG. 1C. The solid-state battery 300 may also be aligned and stacked below one or more solid-state batteries. It should be noted that the solid-state battery 300 may also be connected to other solid-state batteries without stacking, possibly through other arrangements. In some embodiments, the solid-state battery 300 and possibly one or more other solid-state batteries stacked with solid-state battery 300 may be packaged or "pouched" in aluminum, among other possible pouches.

In some embodiments, conductive materials may be used to form the cathode interconnection 328 and the anode interconnection 330. In some embodiments, the conductive material may be used while the solid-state battery is aligned and stacked with other solid-state batteries, possibly with the mechanisms for preventing motion of the solid-state battery 300 as described above. Further, in some embodiments, the substrate 302 may be shorted from top to bottom (or front to back) while using the conductive materials to form the cathode interconnection 328 and the anode interconnection 330.

In some embodiments, forming the cathode interconnection 328 and the anode interconnection 330 may be involve filling the first channel 328c and the second channel 330c with silver, gold, copper, antimony, tin, or a combination thereof. In some embodiments, forming the cathode interconnection 328 and the anode interconnection 330 may involve inserting in the first channel 328c and the second channel 330c, respectively, conductive materials such as an ink, a paste, an epoxy, a wire, a cable, a connector, or a combination thereof.

In some embodiments, a wire may be placed in each of the first channel 328c and the second channel 330c and a conductive epoxy may be used to fill the first channel 328c and the second channel 330c. In some embodiments, a wire used to form the cathode interconnection 328 and the anode interconnection 330 may have a diameter or thickness of about 152 μm. In some instances, the wire-to-cell resistance may range from about 0.6 to 1.3 Ohms (Ω). Further, the wire-to-cell resistance may vary depending on the number of solid-state batteries in a stack. For example, a stack of three solid-state batteries may have a resistance of about 0.7 to 1.1 Ohms and a stack of five may have a resistance of about 0.6 to 1.3 Ohms.

IV. EXAMPLES ASPECTS OF FORMING AN INTERCONNECTION

Figure 4B:
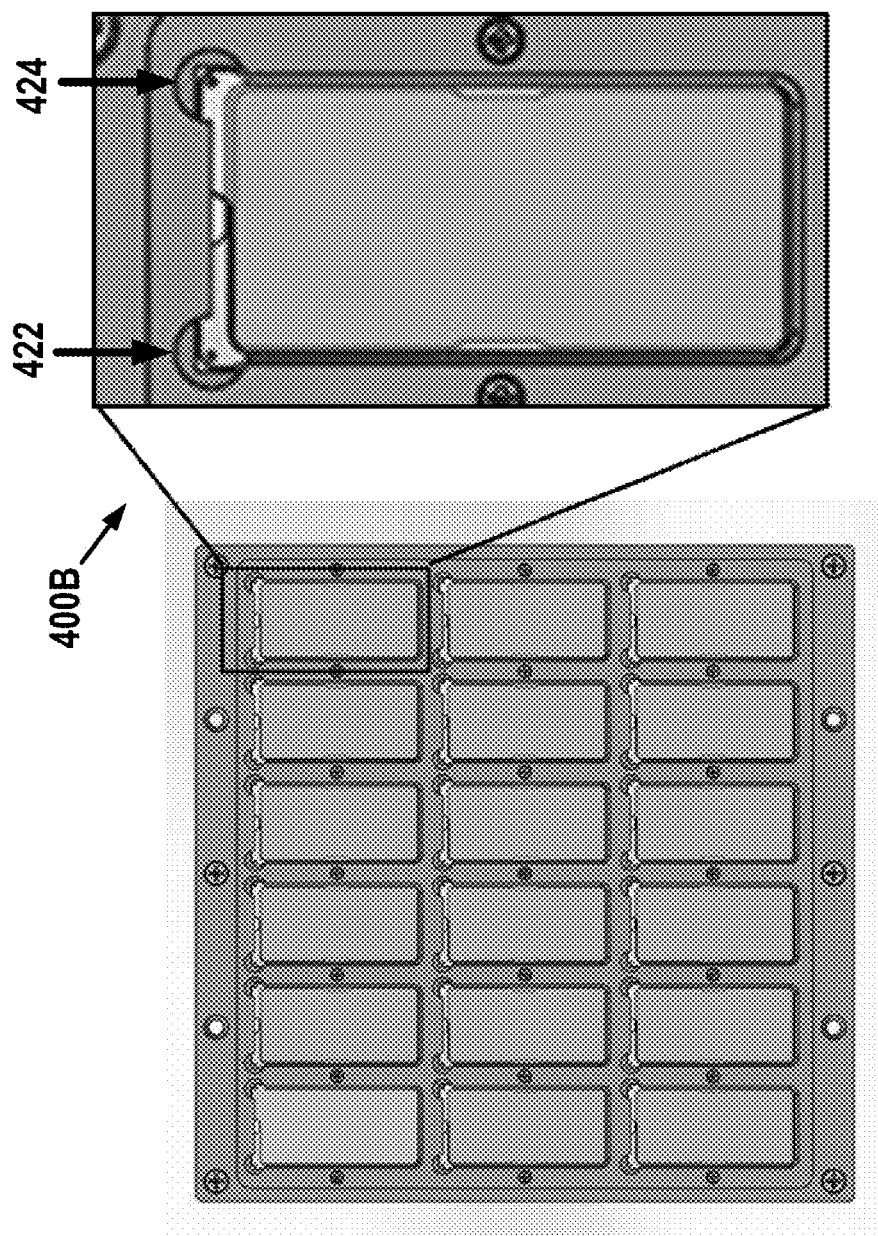
Figure 4C:
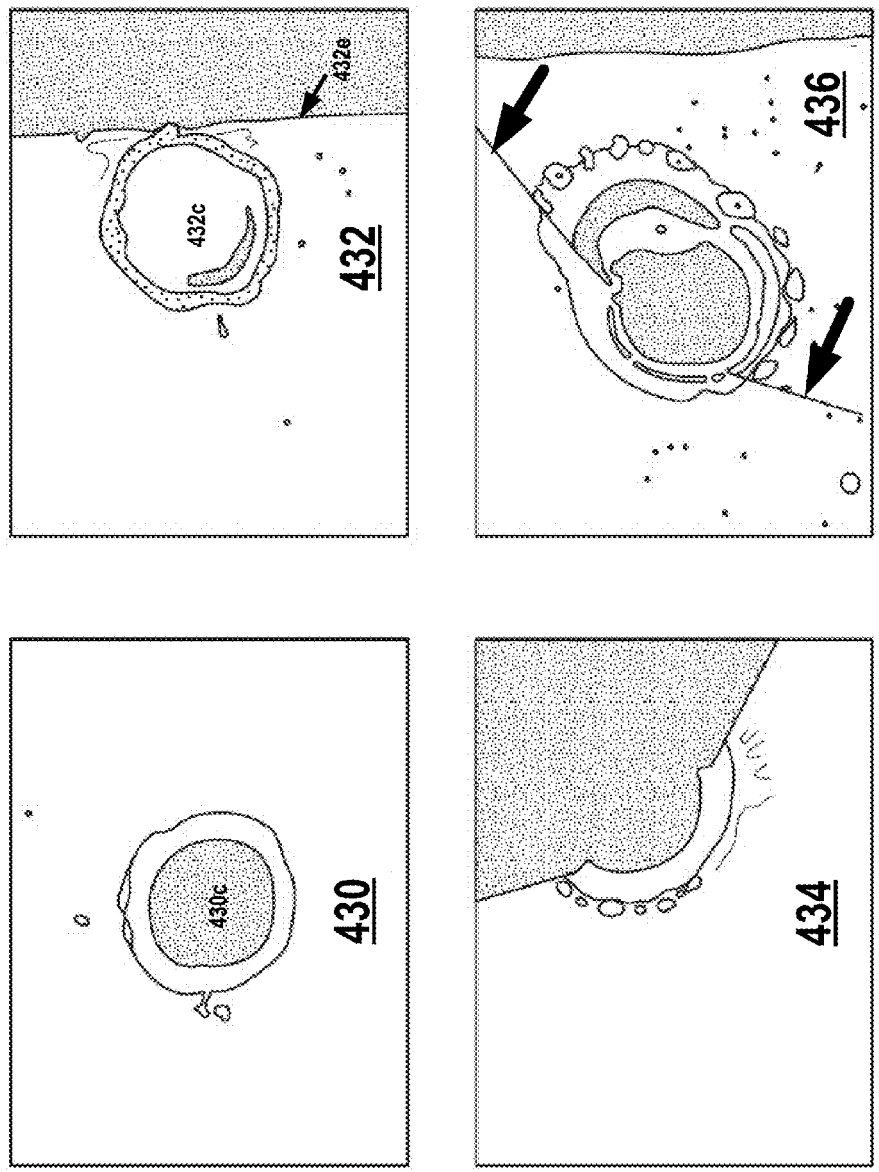

FIGS. 4A through 4C illustrate aspects of forming an interconnection in solid-state batteries, in accordance with some embodiments. The solid-state battery 400A may take any of the forms described above for the solid-state battery 300 in relation to FIGS. 3A through 3G. FIG. 4A illustrates an example birds-eye or top view of various components to the solid-state battery 400A. Further, the methods described for FIGS. 4A through 4C may be carried out in any manner described in the method 200B of FIG. 2B.

As shown, the substrate 402, the first cathode current collector 404, the first anode current collector 406, the first cathode 408, the first solid-state electrolyte 410, the first anode 412, and the first protective coating 414 of solid-state battery 400 may take any of the forms described above for the substrate 302, the first cathode current collector 304, the first anode current collector 306, the first cathode 308, the first solid-state electrolyte 310, the first anode 312, and the first protective coating 314 of solid-state battery 300, respectively, in relation to FIGS. 3A through 3G.

Further, as shown, the second cathode current collector 416, the second anode current collector 418, the second cathode 420, the second solid-state electrolyte 422, the second anode 424, and the second protective coating 426 may take any of the forms described above for the second cathode current collector 316, the second anode current collector 318, the second cathode 320, the second solid-state electrolyte 322, the second anode 324, and the second protective coating 326, respectively, in relation to FIGS. 3A through 3G.

FIG. 4B illustrates a fixture 420 for supporting solid-state battery 400B. In some embodiments, on a first side of the substrate 402, the solid-state battery 400B may be formed with the first cathode current collector 404, the first anode current collector 406, the first cathode 408, the first solid-state electrolyte 410, the first anode 412, and the first protective coating 414, as described above in relation to FIG. 4A. Further, on a second side of the substrate 402, the solid-state battery 400B may be formed with the second cathode current collector 416, the second anode current collector 418, the second cathode 420, the second solid-state electrolyte 422, the second anode 424, and the second protective coating 426 as described above in relation to FIG. 4A. In some embodiments, the solid-state battery 400B may be manufactured in accordance with the method 200A of FIG. 2A and/or the method 200B of FIG. 2B.

In some embodiments, a laser may be to form a first channel through the substrate 402, where the first channel is between the first cathode current collector 404 and the second cathode current collector 416. Further, a laser may be used to form a second channel through the substrate 402, where the second channel is between the first anode current collector 406 and the second anode current collector 418. In some embodiments, the first channel and the second channel of the solid-state battery 400B may, for example, take any of the forms as described above for the first channel 328c and the second channel 330c, respectively, in FIG. 3G. Further, the laser may be used in any manner described above for block 226 of method 200B in FIG. 2B.

In some embodiments, the fixture 420 may provide support for the solid-state battery 400B for using a laser on the solid-state battery 400B. As illustrated in FIG. 4B, the fixture 420 may support several other solid-state batteries. Further, the fixture 420 may include spaces 422 and 424 to expose areas of the solid-state battery 400B, possibly for using the laser on these areas of the solid-state battery 400B. For example, spaces 422 and 424 may expose corners of the solid-state battery 400B. In some instances, other portions of the solid-state battery 400B may be exposed as well. As such, the fixture 420 may fully support the bottom surface of solid-state battery 400B while applying the laser through spaces 422 and 424 on to the solid-state battery 400B.

It should also be understood that the fixture 420 may include additional support (e.g., clamps, locks, immobilizers, fasteners, holders, and compressors) for preventing motion of the solid-state battery 400B while using the laser on the solid-state battery 400B. As illustrated in FIG. 4B, the fixture 420 may provide support for multiple solid-state batteries for using a laser on the other solid-state batteries concurrently, serially, and/or in groups.

FIG. 4C illustrates substrates with channels formed by a laser. In some embodiments, the substrates 430, 432, 434, and 436 may, for example, take any of the forms described above for the substrate 402 in FIG. 4A. Further, the substrates 430, 432, 434, and 436 may, for example, be provided in any of the manners described above for block 202 of method 200A in FIG. 2A, and blocks 222 and 224 of method 200B in FIG. 2B. In some embodiments, the substrates 430, 432, 434, and 436 may illustrate channels formed by a laser in accordance with block 226 of method 200B in FIG. 2B.

As shown in FIG. 4C, the substrate 430 illustrates a channel 430c formed by a laser. Further, the channel 430c of the substrate 430 may form an interconnection. In addition, the channel 432c of the substrate 432 may be formed too close to the edge 432e of the substrate 432 and the center of the channel 432c may not be clear, possibly requiring additional work on the substrate 432 to form an interconnection. Further, possibly due to uses of the laser, the substrate 434 illustrates a portion of the substrate 434 that broke away from the substrate 434. Yet further, the laser may cause the substrate to break or crack, as illustrated by the two arrows pointing to cracks in the substrate 436.

In some embodiments, the laser used to form a first channel and a second channel may have certain characteristics. Further, using the laser may include measuring characteristics of the laser, possibly to avoid breaking substrates. For example, the characteristics laser may include the current and the frequency of the laser. Further, these characteristics may be adjusted to form channels, as illustrated in the substrate 430. In some embodiments, the characteristics of the laser may include currents in the range of about 19 amperes to 31 amperes. Further, the characteristics of the laser may include frequency rates between about 14 kHz and 150 kHz. In some embodiments, variations of currents and frequency may be used. For example, six different currents in the range of about 19 amperes to 29 amperes may be used in combination with six different frequency rates of about 15, 30, 50, 75, 100, and 150 kHz.

In some embodiments, varying the current and the frequency of the laser may increase the yield or success rate of forming channels as illustrated in the substrate 430. For example, using a current of about 19 amperes with a frequency rate of 15 kHz may yield, for example, a 20% rate. Further, a current of about 23 amperes with a frequency rate of 150 kHz may yield, for example, a 46% rate.

V. EXAMPLE METHODS FOR MANUFACTURING A NUMBER OF SOLID-STATE BATTERIES

In some applications, it may be desirable to manufacture a number of solid-state batteries in a single manufacturing process, rather than individually manufacturing solid-state batteries. To this end, the disclosed solid-state batteries may be manufactured using a roll-to-roll manufacturing process, in which a flexible roll including a number of substrates is patterned (e.g., using lithography and/or inkjet printing) and/or adhered to one or more other rolls to form a solid-state battery from each of the number of substrates. The number of substrates may then be separated from one another to produce a number of solid-state batteries.

Figure 5:
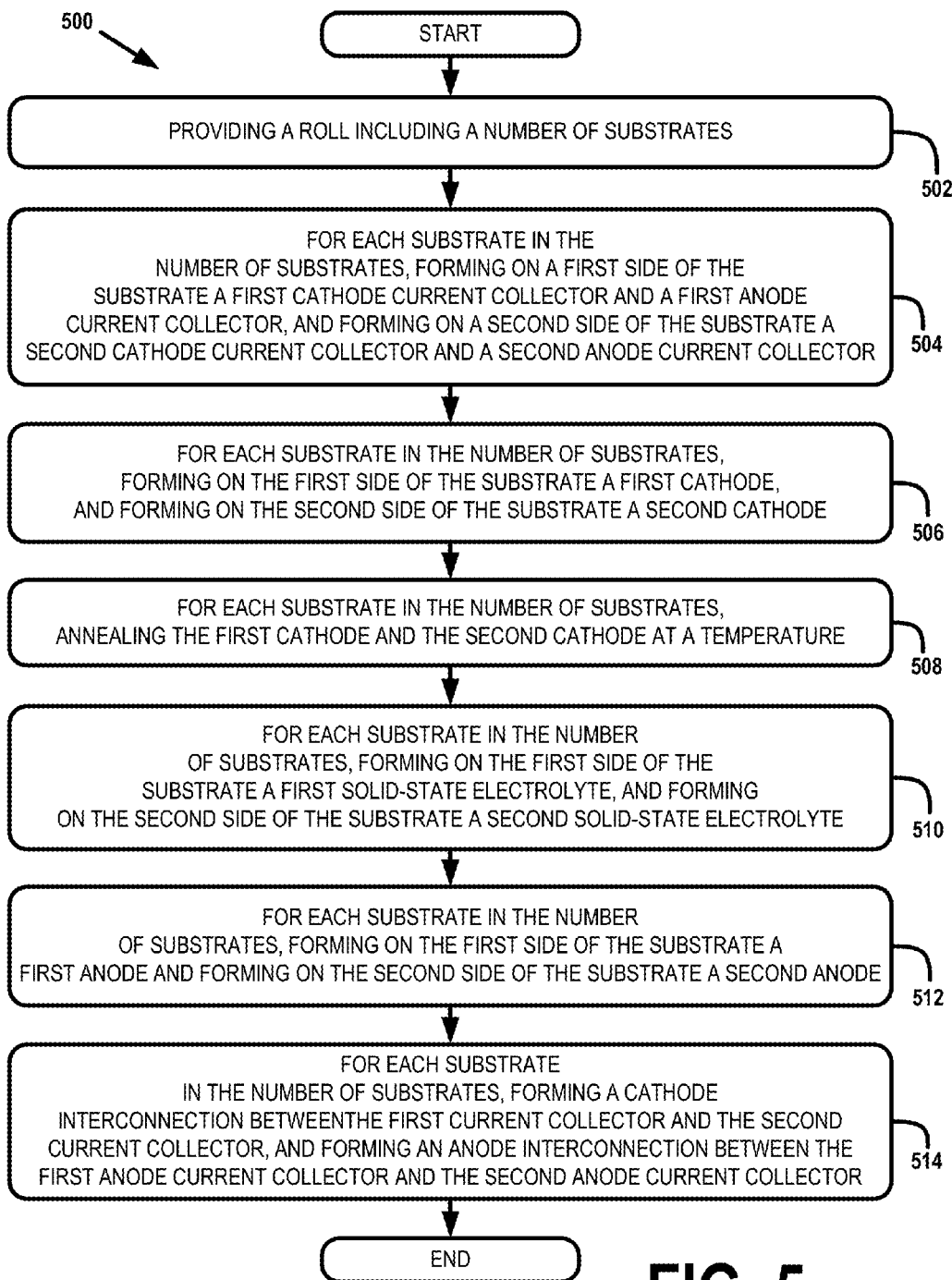
FIG. 5 is a flowchart describing a method of manufacturing a number of solid-state batteries, in accordance with some embodiments.

FIG. 5 is a flowchart describing a method 500 of manufacturing a number of solid-state batteries, in accordance with some embodiments. As shown, the method 500 begins at block 502 with providing a roll including a number of substrates. The roll may take any number of dimensions. In some embodiments, the roll may have a thickness between, for example, about 25 μm and about 40 μm. Other thicknesses are possible as well. Further, in some embodiments, the roll may have a planar length and/or planar width on the order of meters. The dimensions of the roll, including, for example, the planar area and the thickness of the roll, may vary by the application of the solid-state batteries to be manufactured.

The roll may take any of the forms described above for the substrate 402 in relation to FIGS. 4A to 4C. For example, in some embodiments, the roll may be formed of glass, semiconductors, mica, a non-conducting material, and/or possibly a layer of yttria-stabilized zirconia (YSZ). In these embodiments, each substrate in the number of substrates may be formed by a region of the roll. As another example, in some embodiments, the roll may be a layer of YSZ attached to a layer of a metal or ceramic. In these embodiments, each substrate in the number of substrates may be formed by a region of the roll. The roll may take other forms as well. Any number of substrates may be included in the roll, and the substrates may be arranged in any pattern.

The method 500 continues at block 504 with, for each substrate in the number of substrates, forming on a first side of the substrate a first cathode current collector and a first anode current collector, and forming on a second side of the substrate a second cathode current collector and a second anode current collector. The first cathode current collector, the second cathode current collector, the first anode current collector, and the second anode current collector may, for example, take any of the forms described above for the first cathode current collector 404, the second cathode current collector 416, the first anode current collector 406, and the second anode current collector 418, respectively, in FIG. 4A.

Each cathode current collector and anode current collector may be provided in any of the manners described above for block 204 in relation to FIG. 2A, and blocks 222 and 224 in relation to FIG. 2B. In some embodiments, each cathode current collector and anode current collector may be formed through patterning (e.g., lithography and/or inkjet printing) and/or may be preformed on an additional roll that is rolled over and adhered to the roll including the substrates. The cathode current collectors and anode current collectors may be formed in other manners as well. The cathode current collectors and anode current collectors may be formed concurrently, serially, and/or in groups.

The method 500 continues at block 506 with, for each substrate in the number of substrates, forming on the first side of the substrate a first cathode and forming on the second side of the substrate a second cathode. The first cathode and the second cathode may be composed of $LiCoO_2$, where the first cathode is in electrical contact with the first cathode current collector, and where the second cathode is in electrical contact with the second cathode current collector. Each cathode may take any of the forms described above for the first cathode 408 and the second cathode 420 in relation to FIG. 4A. Further, each cathode may be formed in any of the manners described above for block 206 in relation to FIG. 2A. Alternatively, each cathode may be formed through patterning (e.g., lithography and/or inkjet printing) and/or may be preformed on an additional roll that is rolled over and adhered to the roll including the substrates. The cathodes may be formed in other manners as well. The cathodes may be formed concurrently, serially, and/or in groups.

The method 500 continues at block 508 with, for each substrate in the number of substrates, annealing the first cathode and the second cathode at a temperature between about 700° C. and about 800° C. Each cathode may be annealed in any of the manners described above for block 208 of method 200A in FIG. 2. The cathodes may be annealed concurrently, serially, and/or in groups.

The method 500 continues at block 510 with, for each substrate in the number of substrates, forming a first solid-state electrolyte and a second solid-state electrolyte. The first solid-state electrolyte and the second solid-state electrolyte may be composed of LiPON. Each solid-state electrolyte may take any of the forms described above for the first solid-state electrolyte 410 and the second solid-state electrolyte 422 in relation to FIG. 4A. Further, each solid-state electrolyte may be formed in any of the manners described above for block 210 of method 200A in FIG. 2A. Alternatively, each solid-state electrolyte may be formed through patterning (e.g., lithography and/or inkjet printing) and/or may be preformed on an additional roll that is rolled over and adhered to the roll including the substrates. The solid-state electrolytes may be formed in other manners as well. The solid-state electrolytes may be formed concurrently, serially, and/or in groups.

The method 500 continues at block 512 with, for each substrate in the number of substrates, forming on the first side of the substrate a first anode and forming on the second side of the substrate a second anode. The first anode and the second anode may be composed of lithium. The first anode may be in electrical contact with the first anode current collector and the first solid-state electrolyte may be formed between the first anode and the first cathode. The second anode may be in electrical contact with the second anode current collector and the second solid-state electrolyte may be formed between the second anode and the second cathode.

Each anode may take any of the forms described above for the first anode 412 and the second anode 424 in relation to FIG. 4A. Further, each anode may be formed in any of the manners described above for block 212 in relation to FIG. 2A. Alternatively, each anode may be formed through patterning (e.g., lithography and/or inkjet printing) and/or may be preformed on an additional roll that is rolled over and adhered to the roll including the substrates. The cathodes may be formed in other manners as well. The anodes may be formed concurrently, serially, and/or in groups.

The method 500 continues at block 514, for each substrate in the number of substrates, forming a cathode interconnection between the first current collector and the second current collector, and forming an anode interconnection between the first anode current collector and the second anode current collector. Each cathode interconnection and anode interconnection may take any of the forms described above for the cathode interconnection 328 and the anode interconnection 330 in FIG. 3G. Further, each cathode interconnection and anode interconnection may be formed in any of the manner described above for method 200B of FIG. 2B.

In some embodiments, a laser may be used to form a first channel through the substrate, where the first channel is between the first cathode current collector and the second cathode current collector. Further, the laser may also be used to form a second channel through the substrate, where the second channel is between the first anode current collector and the second anode current collector. In some embodiments, the laser may, for example, be used in any manner as described above for FIGS. 4A through 4C.

In some embodiments, using the laser to form the first channel through the substrate includes penetrating through the first cathode current collector, the substrate, and the second cathode current collector. Further, using the laser to form the second channel through the substrate comprises penetrating through the first anode current collector, the substrate, and the second anode current collector.

In some embodiments, the method 500 may further include, for each substrate in the number of substrates, forming a first protective coating substantially covering the first anode and forming a second protective coating substantially covering the second anode. The first protective coating and the second protective coating may, for example, take any of the forms described above for the first protective coating 414 and the second protective coating 426, respectively, in relation to FIG. 4A. In some embodiments, each protective coating may be formed through patterning (e.g., lithography and/or inkjet printing) and/or may be preformed on an additional roll that is rolled over and adhered to the roll including the substrates. The protective coatings may be formed in other manners as well. The protective coatings may be formed concurrently, serially, and/or in groups. Alternatively, in some embodiments, no protective coating may be formed.

In some embodiments, the method 500 may further include separating each of the substrates in the number of substrates from one another, thereby forming a number of solid-state batteries. Each solid-state battery may include a respective substrate. The substrates may be separated using, for example, die cutting and/or laser cutting. The substrates may be separated in other manners as well.

Figure 6A:
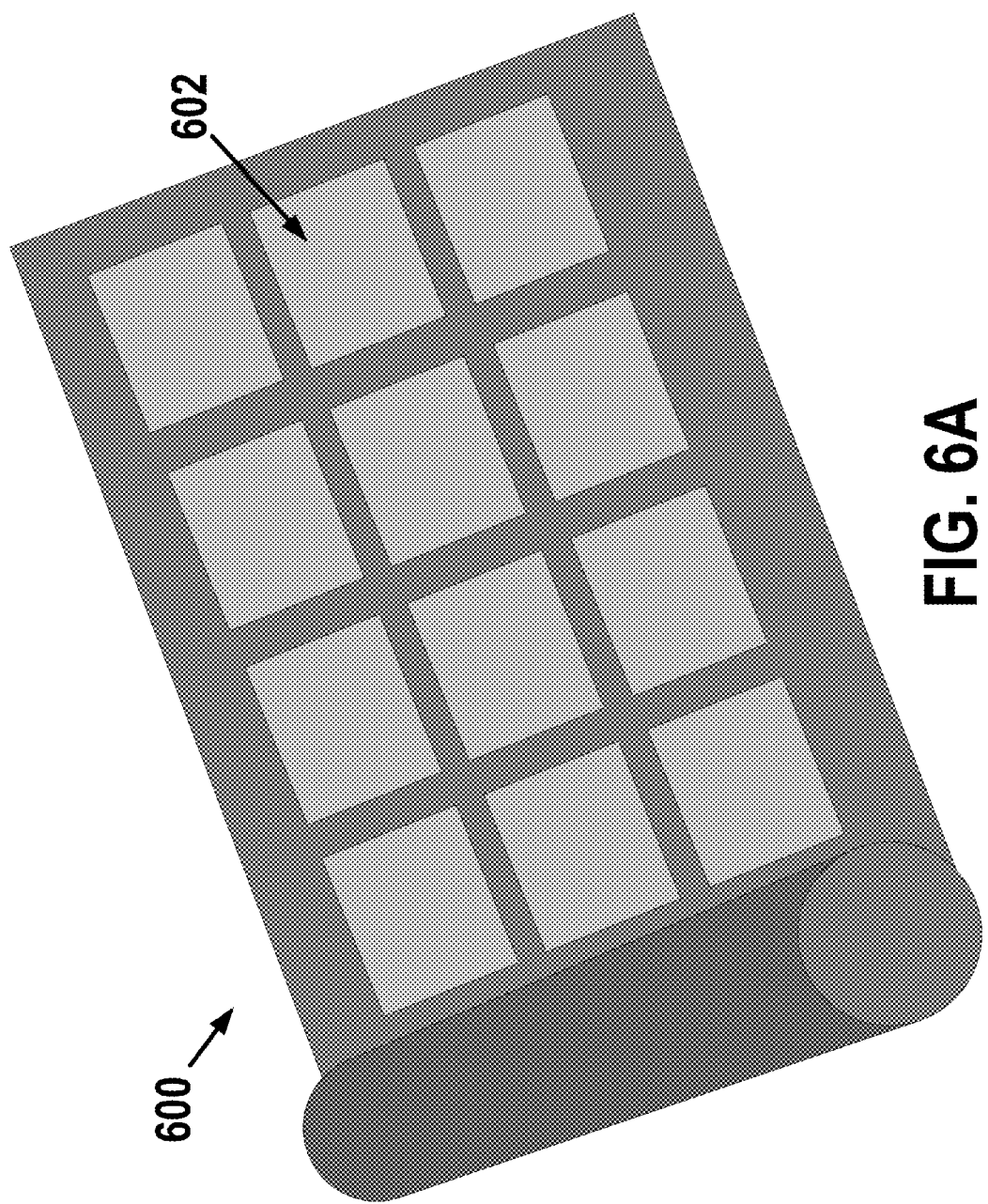
FIGS. 6A to 6C illustrate a method of manufacturing a number of solid-state batteries, in accordance with some embodiments.
Figure 6B:
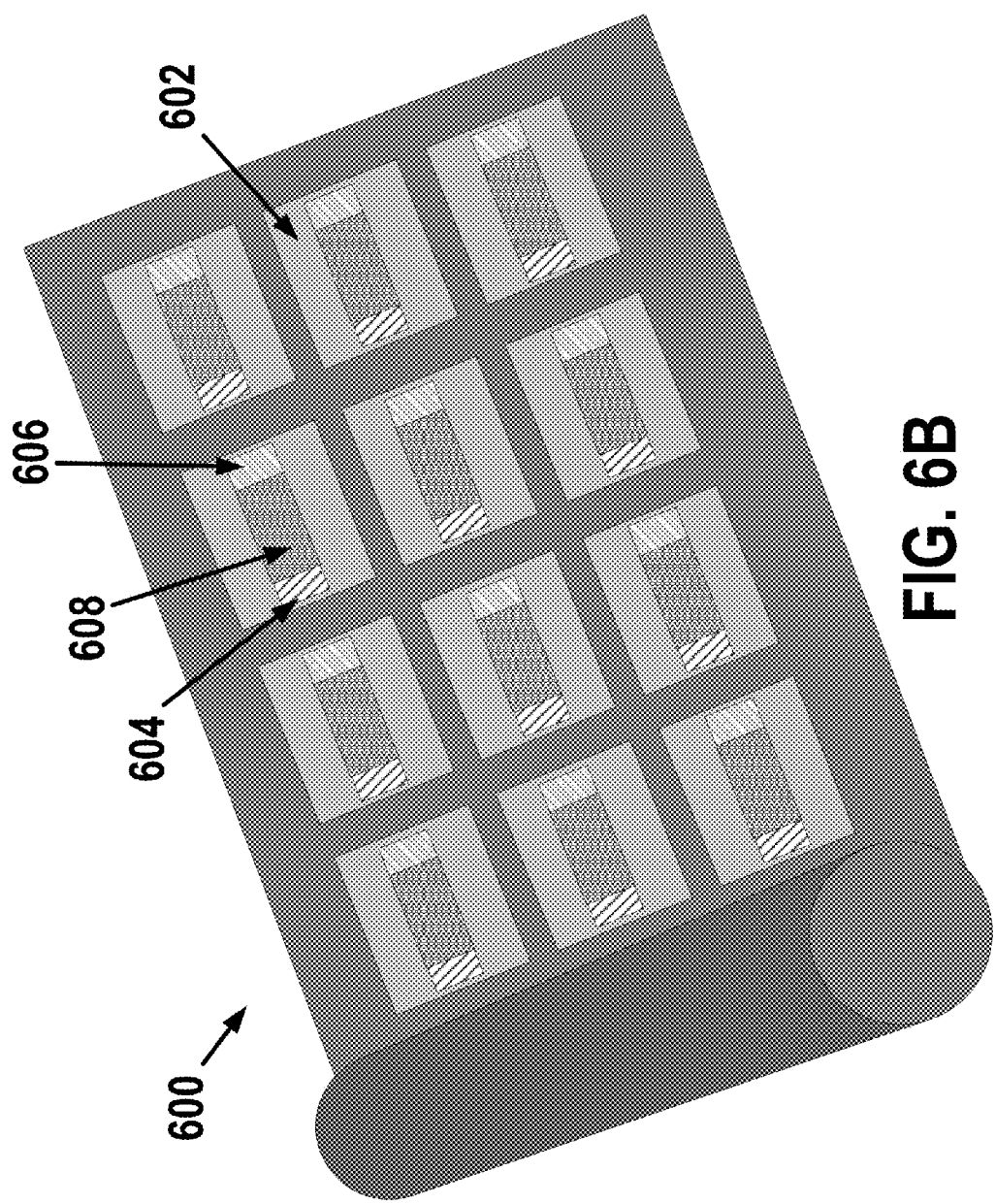
Figure 6C:
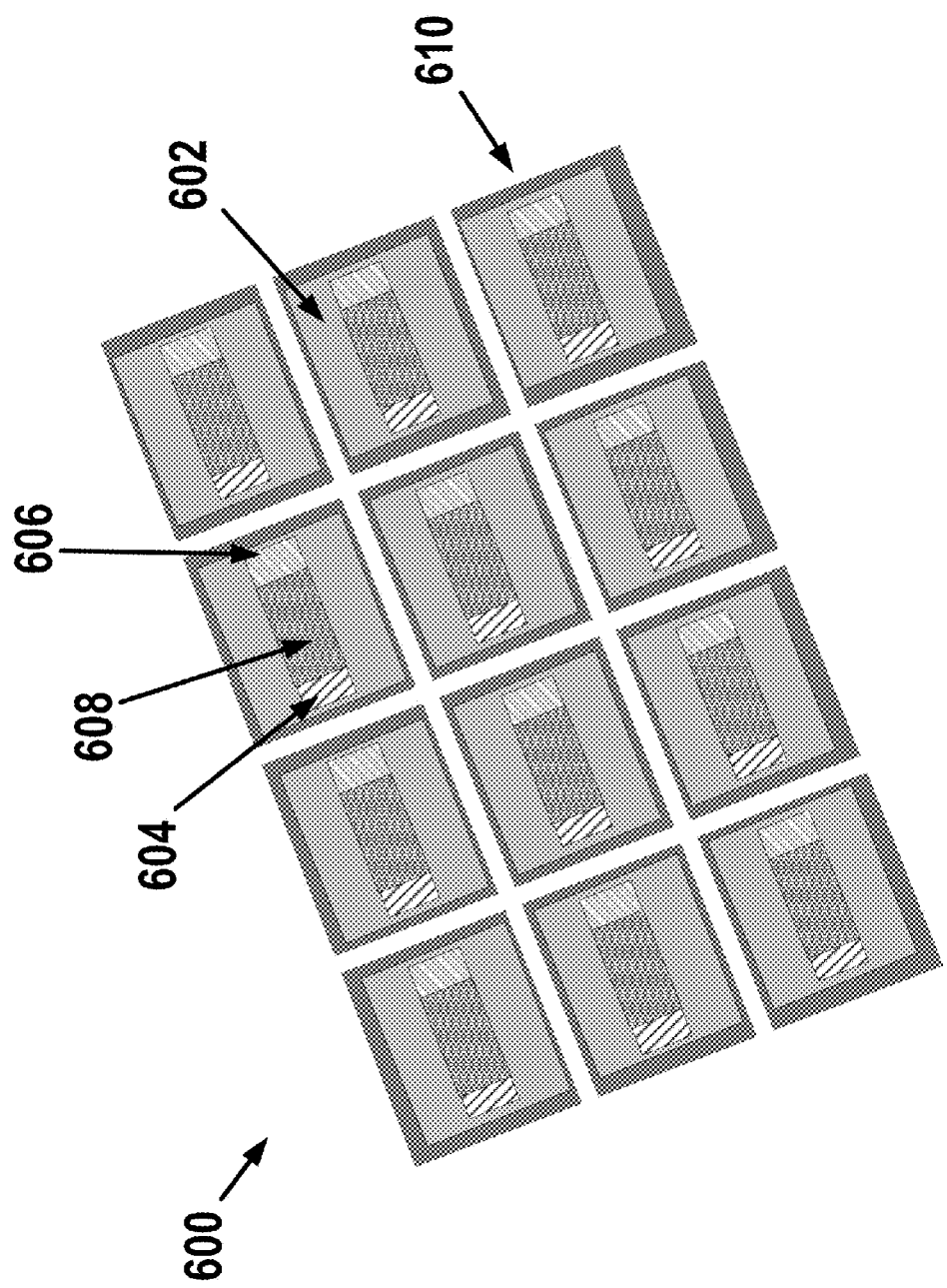

FIGS. 6A through 6C illustrate a method of manufacturing a number of solid-state batteries. In some embodiments, each solid-state battery may include a substrate composed of glass, semiconductors, mica, a non-conducting material, and/or possibly a layer of yttria-stabilized zirconia (YSZ), in accordance with some embodiments. The method may be, for example, the method 500 described above in relation to FIG. 5.

As shown in FIG. 6A, a roll 500 may be provided that includes a number of substrates 602. In some embodiments, the roll 600 may be formed of glass, semiconductors, mica, a non-conducting material, and/or possibly a layer of YSZ. In these embodiments, each substrate in the number of substrates 602 may be formed by a region of the roll 600. As another example, in some embodiments, the roll 600 may be a layer of YSZ attached to a layer of a metal or ceramic. In these embodiments, each substrate in the number of substrates 602 may be formed by a region of the roll 600. The roll 600 may take other forms as well. Any number of substrates may be included in the roll 600, and the substrates may be arranged in any pattern.

As shown in FIG. 6B, a solid-state battery may be formed on each substrate in the number of substrates 602. In particular, for each substrate, a first cathode current collector 604, a first anode current collector 606, a first cathode (not visible from the top view), a first solid-state electrolyte (not visible from the top view), and a first anode 608 may be formed. In addition, for each substrate, a second cathode current collector, a second anode current collector, a second cathode, a second solid-state electrolyte, and a second anode may be formed (all not visible from the top view).

Each of the first cathode current collector 604, the first anode current collector 606, the first cathode, the first solid-state electrolyte, and the first anode 608 may take any of the forms described above for the first cathode current collector 404, the first anode current collector 406, the first cathode 408, the first solid-state electrolyte 410, and the first anode 412, respectively, in relation to FIG. 4A. Further, each of the second cathode current collector, the second anode current collector, the second cathode, the second solid-state electrolyte, and the second anode may take any of the forms described above for the second cathode current collector 416, the second anode current collector 418, the second cathode 420, the second solid-state electrolyte 422, and the second anode 424, respectively, in relation to FIG. 4A.

Further, each of the first cathode current collector 604, the second cathode current collector, the first anode current collector 606, and the second anode current collector may be formed in any of the manners described above for block 504 in relation to FIG. 5. Moreover, each of the first cathode, the second cathode, the first solid-state electrolyte, the second solid-state electrolyte, the first anode 608, and the second anode may be formed in any of the manners described above for blocks 506, 510, and 512, respectively, in relation to FIG. 5.

One or more of the first cathode current collector 604, the second cathode current collector, the first anode current collector 606, the second anode current collector, the first cathode, the second cathode, the first solid-state electrolyte, the second solid-state electrolyte, the first anode 608, and the second anode may be formed during the same manufacturing step, or each may be formed during a separate manufacturing step.

Further, for each substrate, a cathode interconnection may be formed for the first cathode current collector 604 and the second cathode current collector. Yet further, an anode interconnection may be formed for the first anode current collector 608 and the second anode current collector. The cathode interconnection and the anode interconnection may be formed in any of the manners described above for block 514 in relation to FIG. 5.

In some embodiments, protective coatings (not shown) may additionally be formed that substantially covers each of the first anodes 608 and the second anodes. The protective coating may, for example, take any of the forms described above for the first protective coating 414 and the second protective coating 426 in relation to FIG. 4A. In other embodiments, such as that shown, no protective coating may be formed.

In any case, each first cathode current collector 604, second cathode current collector, first anode current collector 606, second anode current collector, first cathode, second cathode, first solid-state electrolyte, second solid-state electrolyte, first anode 608, and second anode, together with the substrate on which they are formed, may form a solid-state battery. The solid-state batteries may then be separated, as shown in FIG. 6C. Each of the solid-state batteries 610 may include a respective substrate. The solid-state batteries 610 may be separated using, for example, die cutting and/or laser cutting. The solid-state batteries 610 may be separated in other manners as well.

While the solid-state batteries 610 in FIG. 6C are shown from a top view, each solid-state battery may appear from a side or cross-sectional view to be similar to the solid-state battery 300 described above in relation to FIGS. 3A through 3G. (While the solid-state battery 300 in FIG. 3G is shown to include a first protective coating 314 and a second protective coating 326, each of the solid-state batteries 610 may or may not include a protective coating, as described above.)

VI. EXAMPLE SUBSTRATES FOR A SOLID-STATE BATTERY

In some instances, solid-state batteries formed on substrate materials may exhibit limited energy densities on the order of approximately 97-150 Wh/L. These limited energy densities are the result of a number of factors. In some embodiments, the energy densities of solid-state batteries formed on copper, stainless steel, and polyimide substrates may be limited by the mismatch between the coefficients of thermal expansion (CTEs) of the substrate materials and the CTE of $LiCoO_2$, which limits the thickness of the $LiCoO_2$ cathode that can be grown on each of these substrates. Growth of $LiCoO_2$ at greater thicknesses on these substrates results in cracking and peeling off of the $LiCoO_2$.

In some embodiments, the energy densities are limited by the annealing temperature that may be used during manufacture of the solid-state battery. To optimize the crystallization and crystal orientation of a lithium cobalt oxide ($LiCoO_2$) cathode (and, accordingly, the energy density of the solid-state battery), it may be desirable to anneal the $LiCoO_2$ cathode at a temperature between about 700° C. and about 800° C. Additionally, the solid-state battery can have an energy density of 100 Wh/L.

However, polyimide substrates cannot withstand such high annealing temperatures; rather, polyimide is limited to an annealing temperature of approximately 400° C. Copper can withstand annealing temperatures of approximately 700-800° C., but with the result that the copper will oxidize during annealing. Further, while stainless steel can similarly withstand an annealing temperature of approximately 700-800° C., during annealing at such temperatures alloying elements in the stainless steel (e.g., chromium) migrate into the $LiCoO_2$ cathode, thereby reducing the cycle life of the solid-state battery.

In some embodiments, yttria-stabilized zirconia (YSZ) can withstand high annealing temperatures between about 700° C. and about 800° C., allowing for desirable annealing of $LiCoO_2$. Additionally, YSZ has a near-zero coefficient of thermal expansion at approximately 800° C., allowing for the growth of thicker layers of LiCoO2 without cracking or peeling of the $LiCoO_2$. As a result, solid-state batteries having a YSZ substrate may exhibit an improved energy density of approximately 1030 Wh/L.

In some embodiments, a substrate may be a stand-alone layer of YSZ. Alternatively, in other embodiments, the substrate may further include a layer of a metal or a ceramic. In these embodiments, the YSZ of the substrate may be attached to the layer of the metal or the ceramic. The cathode current collector and the anode current collector may then be formed on the YSZ. A molar concentration of yttria in the YSZ of a substrate may vary by application. In some embodiments, the molar concentration of yttria in the YSZ may be, for example, approximately 3%. Other molar concentrations of yttria are possible as well.

VII. CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A battery comprising:
    a substrate comprising yttria-stabilized zirconia (YSZ) having a first surface and a second surface;
    a first cathode current collector having a surface in contact with the first surface of the substrate;
    a first anode current collector having a surface in contact with the first surface of the substrate;
    a second cathode current collector having a surface in contact with the second surface of the substrate;
    a second anode current collector having a surface in contact with the second surface of the substrate;
    a cathode interconnection, via a first channel through the substrate, in contact with the surface of the first cathode current collector and the surface of the second cathode current collector; and
    an anode interconnection, via a second channel through the substrate, in contact with the surface of the first anode current collector and the surface of the second anode current collector.

2. The battery of claim 1, wherein at least one of the first channel and the second channel is formed by a laser.

3. The battery of claim 1, wherein the first channel is located in a first corner of the substrate, and wherein the second channel is located in a second corner of the substrate adjacent to the first corner of the substrate.

4. The battery of claim 1, wherein at least one of the cathode interconnection or the anode interconnection comprises one or more of the following: (a) silver, (b) gold, (c) copper, (d) antimony, or (e) tin.

5. The battery of claim 1, wherein at least one of the cathode interconnection or the anode interconnection comprises one or more of the following conductive materials: (a) an ink, (b) a paste, (c) an epoxy, (d) a wire, (e) a cable, or (f) a connector.

6. A method of manufacturing a battery comprising:
    providing on a first surface of a substrate a first cathode current collector and a first anode current collector such that a surface of the first cathode current collector is in contact with the first surface of the substrate and a surface of the first anode current collector is in contact with the first surface of the substrate, wherein the substrate comprises yttria-stabilized zirconia (YSZ);
    providing on a second surface of the substrate a second cathode current collector and a second anode current collector such that a surface of the second cathode current collector is in contact with the second surface of the substrate and a surface of the second anode current collector is in contact with the second surface of the substrate;
    using at least one laser to form: (a) a first channel through the substrate, wherein the first channel is between the first cathode current collector and the second cathode current collector, and (b) a second channel through the substrate, wherein the second channel is between the first anode current collector and the second anode current collector;
    forming a cathode interconnection, via the first channel, in contact with the surface of the first cathode current collector and the surface of the second cathode current collector; and
    forming an anode interconnection, via the second channel, in contact with the surface of the first anode current collector and the surface of the second anode current collector.

7. The method of claim 6, wherein using the at least one laser to form the first channel or using the at least one laser to form the second channel comprises operating the at least one laser at (a) a current between 19 amperes and 31 amperes or (b) a frequency between 14 kHz and 150 kHz.

8. The method of claim 6, wherein using the at least one laser to form the first channel through the substrate and the second channel through the substrate comprises using the at least one laser without breaking the substrate.

9. The method of claim 8, wherein using the at least one laser without breaking the substrate comprises supporting the substrate with a fixture, and wherein the fixture comprises a plurality of openings for the at least one laser to penetrate the substrate.

10. The method of claim 6, wherein the method further comprises one or more of (a) aligning the battery with one or more additional batteries or (b) stacking the battery with the one or more additional batteries.

11. The method of claim 6, wherein the method further comprises:
    forming a first cathode and a second cathode, wherein the first cathode is in electrical contact with the first cathode current collector, and wherein the second cathode is in electrical contact with the second cathode current collector; and
    annealing the first cathode and the second cathode.

12. The method of claim 11, wherein the method further comprises:
    forming a first anode and a second anode, wherein the first anode is in electrical contact with the first anode current collector, and wherein the second anode is in electrical contact with the second anode current collector; and forming a first solid-state electrolyte and a second solid-state electrolyte, wherein the first solid-state electrolyte is between the first cathode and the first anode, and wherein the second solid-state electrolyte is between the second cathode and the second anode.

13. The method of claim 6, wherein forming the cathode interconnection and forming the anode interconnection comprises filling the first channel and the second channel, respectively, with one or more of the following: (a) silver, (b) gold, (c) copper, (d) antimony, or (e) tin.

14. The method of claim 6, wherein forming the cathode interconnection and forming the anode interconnection comprises inserting in the first channel and the second channel, respectively, one or more of the following conductive materials: (a) an ink, (b) a paste, (c) an epoxy, (d) a wire, (e) a cable, or (f) a connector.

15. A method comprising:
providing a roll comprising a plurality of substrates, wherein each substrate of the plurality of substrates comprises yttria-stabilized zirconia (YSZ); and for each substrate in the plurality of substrates:
forming on a first surface of the substrate a first cathode current collector and a first anode current collector such that a surface of the first cathode current collector is in contact with the first surface of the substrate and a surface of the first anode current collector is in contact with the first surface of the substrate;
forming on a second surface of the substrate a second cathode current collector and a second anode current collector such that a surface of the second cathode current collector is in contact with the second surface of the substrate and a surface of the second anode current collector is in contact with the second surface of the substrate;
forming on the first cathode current collector a first cathode, and forming on the second cathode current collector a second cathode;
annealing the first cathode and the second cathode;
forming on the first cathode a first solid-state electrolyte, and forming on the second cathode a second solid-state electrolyte;
forming on the first solid-state electrolyte a first anode, and forming on the second solid-state electrolyte a second anode;
forming a cathode interconnection in contact with the surface of the first cathode current collector and the surface of the second cathode current collector; and
forming an anode interconnection in contact with the surface of the first anode current collector and the surface of the second anode current collector.

16. The method of claim 15, wherein forming the cathode interconnection comprises using at least one laser to form a first channel through the substrate, wherein the first channel is between the first cathode current collector and the second cathode current collector, wherein forming the anode interconnection comprises using the at least one laser to form a second channel through the substrate, and wherein the second channel is between the first anode current collector and the second anode current collector.

17. The method of claim 16, wherein using the at least one laser to form the first channel or using the at least one laser to form the second channel comprises operating the at least one laser at (a) a current between 19 amperes and 31 amperes or (b) a frequency between 14 kHz and 150 kHz.

18. The method of claim 16, wherein using the at least one laser to form the first channel through the substrate and the second channel through the substrate comprises using the at least one laser without breaking the substrate.

19. The method of claim 11, wherein annealing the first cathode and the second cathode comprises annealing the first cathode and the second cathode at a temperature between 700° C. and 800° C.

20. The method of claim 11, wherein annealing the first cathode and the second cathode comprises annealing the first cathode and the second cathode for a duration between 2 hours and 4 hours.

* * * * *